US010552482B2

(12) United States Patent
Batchu Krishnaiahsetty et al.

(10) Patent No.: US 10,552,482 B2
(45) Date of Patent: Feb. 4, 2020

(54) ELECTRONIC SYSTEM AND METHOD FOR MARKING HIGHLIGHTS IN A MULTIMEDIA FILE AND MANIPULATING THE MULTIMEDIA FILE USING THE HIGHLIGHTS

(71) Applicant: Sumana Batchu Krishnaiahsetty, Bangalore (IN)

(72) Inventors: Sumana Batchu Krishnaiahsetty, Bangalore (IN); Rishab Omprakash Makam, Bangalore (IN); Rajani K N, Bangalore (IN)

(73) Assignee: Sumana BATCHU KRISHNAIAHSETTY, Bangalore (IN)

( * ) Notice: Subject to any disclaimer, the term of this patent is extended or adjusted under 35 U.S.C. 154(b) by 320 days.

(21) Appl. No.: 15/322,719

(22) PCT Filed: Apr. 21, 2015

(86) PCT No.: PCT/IB2015/052890
§ 371 (c)(1),
(2) Date: Dec. 28, 2016

(87) PCT Pub. No.: WO2015/162548
PCT Pub. Date: Oct. 29, 2015

(65) Prior Publication Data
US 2017/0169128 A1 Jun. 15, 2017

(30) Foreign Application Priority Data

Apr. 22, 2014 (IN) .......................... 2059/CHE/2014

(51) Int. Cl.
*G06F 16/80* (2019.01)
*G06F 17/00* (2019.01)
(Continued)

(52) U.S. Cl.
CPC .............. *G06F 16/80* (2019.01); *G06F 17/00* (2013.01); *H04N 1/32122* (2013.01);
(Continued)

(58) Field of Classification Search
CPC ..... G06F 16/80; G06F 17/00; H04N 1/32122; H04N 21/80; H04N 21/8133
See application file for complete search history.

(56) References Cited

U.S. PATENT DOCUMENTS

| 8,542,702 B1 | 9/2013 | Cavanaugh |
| 2003/0033606 A1* | 2/2003 | Puente ............... H04N 7/17336 725/110 |

(Continued)

FOREIGN PATENT DOCUMENTS

WO    WO2009064516 A1    5/2009

OTHER PUBLICATIONS

International Search Report dated Sep. 22, 2015.

*Primary Examiner* — Thai Q Tran
*Assistant Examiner* — Sunghyoun Park
(74) *Attorney, Agent, or Firm* — Maschoff Brennan

(57) ABSTRACT

The present disclosure relates to a method and a system for marking multimedia files with file-marks and manipulating multimedia file(s) with the help of file-marks. In an embodiment, the present disclosure provides a method to link searchable keywords and tags to each of the file-marks. Each user of the multimedia file can define an index of file-marks with associated keywords and tags. The user of the multimedia file is provided with an option to play highlights created by a chosen set of users. One or more actions are initiated at the time of file-marking, associating the keywords and tags with a file-mark or at the time of manipulating the file-marked multimedia file. It also provides a method for facilitating file-marking one or more media files (Continued)

by one or more external file-marking device(s). Further, disclosure presents methods to efficiently encode and decode a multimedia file with highlights.

26 Claims, 10 Drawing Sheets

(51) Int. Cl.
  *H04N 21/81*   (2011.01)
  *H04N 21/8405*  (2011.01)
  *H04N 21/845*  (2011.01)
  *H04N 21/8549*  (2011.01)
  *H04N 1/32*   (2006.01)
  *H04N 21/80*   (2011.01)
  *H04N 21/8543*  (2011.01)

(52) U.S. Cl.
  CPC ......... *H04N 21/80* (2013.01); *H04N 21/8133* (2013.01); *H04N 21/8405* (2013.01); *H04N 21/845* (2013.01); *H04N 21/8456* (2013.01); *H04N 21/8543* (2013.01); *H04N 21/8549* (2013.01); *H04N 2201/3242* (2013.01); *H04N 2201/3245* (2013.01)

(56) References Cited

U.S. PATENT DOCUMENTS

2007/0300258 A1\* 12/2007 O'Connor ................. A23L 2/52
                   725/44
2008/0114729 A1\* 5/2008 Raman .................. G06F 16/907
2011/0026900 A1 2/2011 Lussier et al.

\* cited by examiner

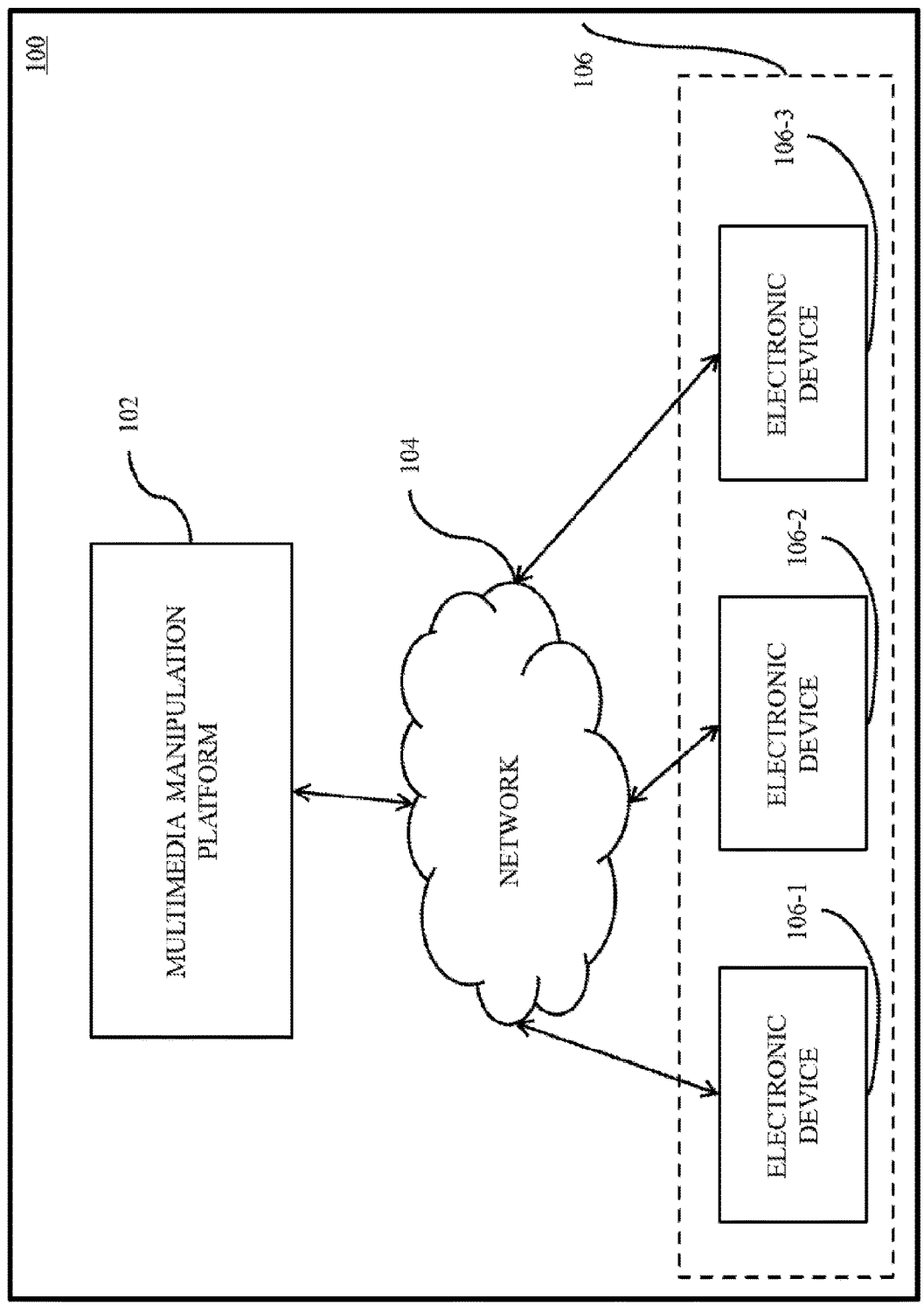
Figure 1: System for Media Manipulation

Figure 2: Media Manipulation Platform 102
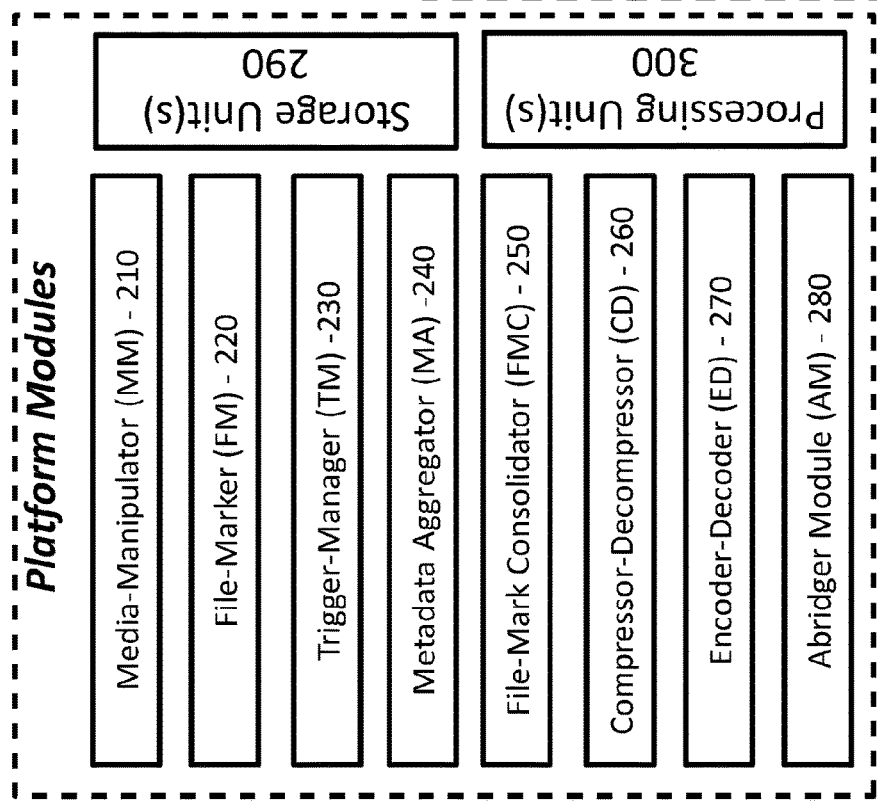
Figure 2a: Storage Unit Components
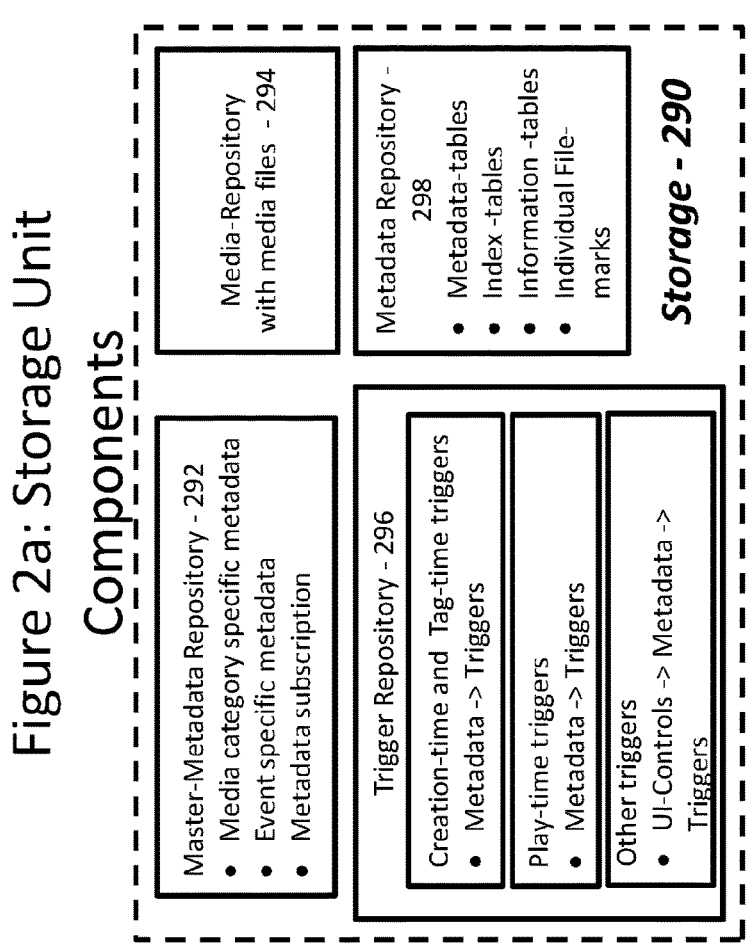

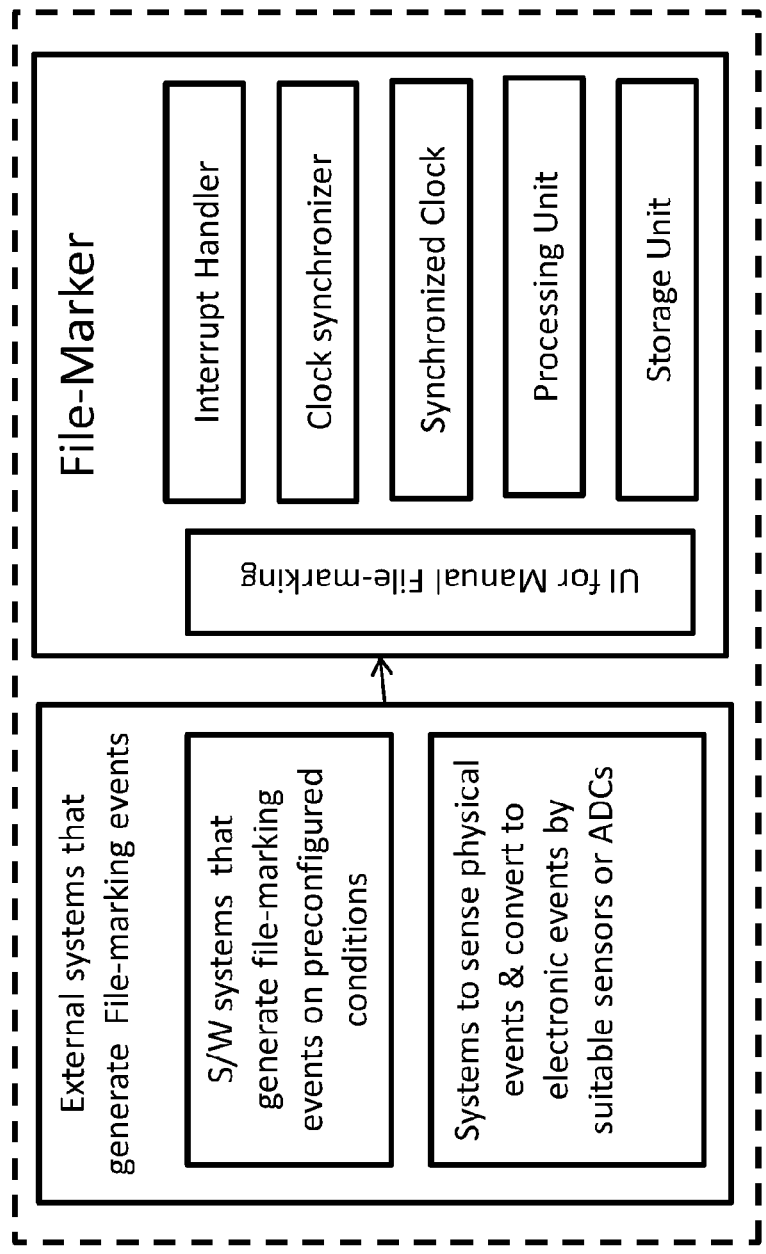
Figure 2b: An embodiment of Electronic Device 106

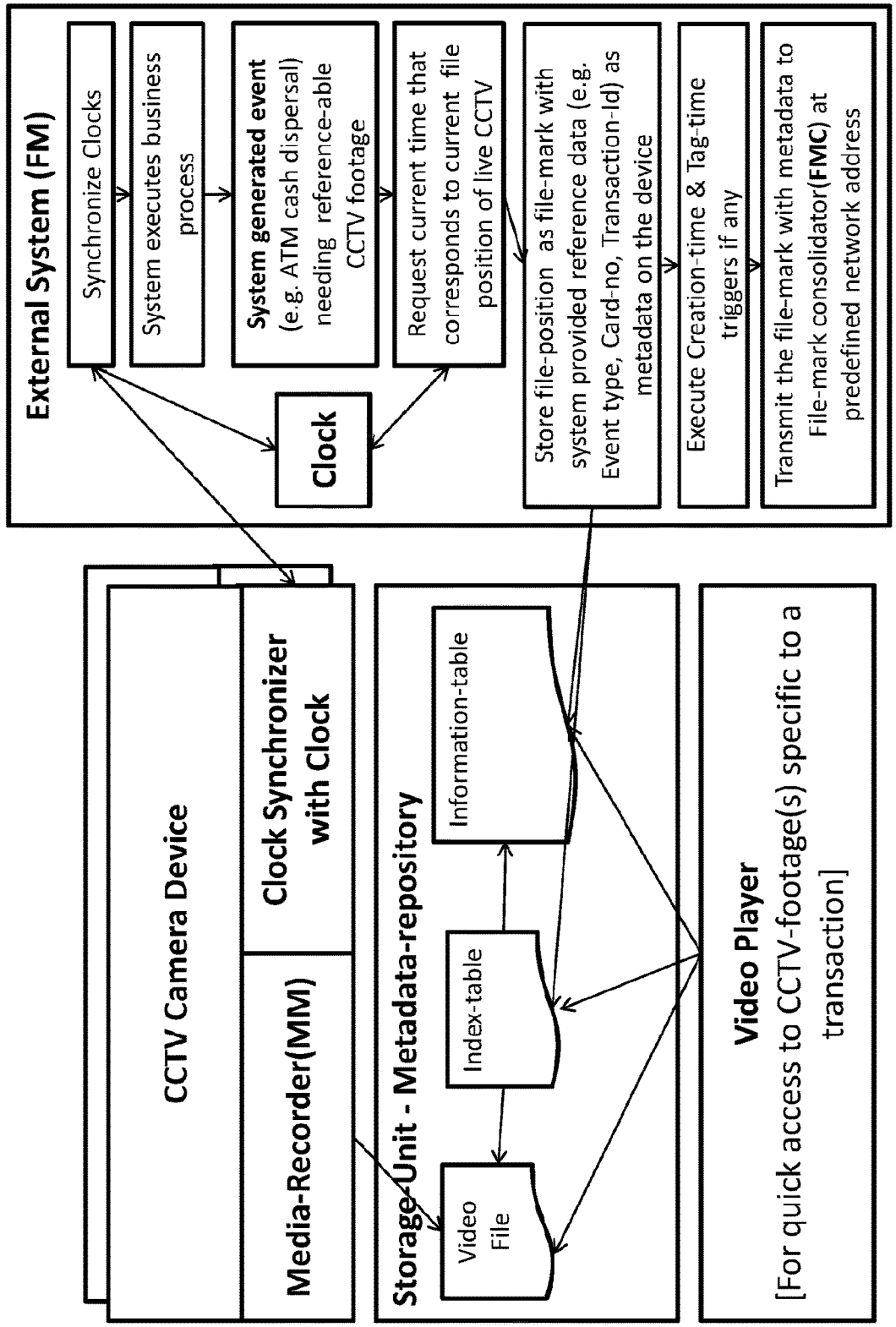
Figure 3: Automatic File-marking on System Events

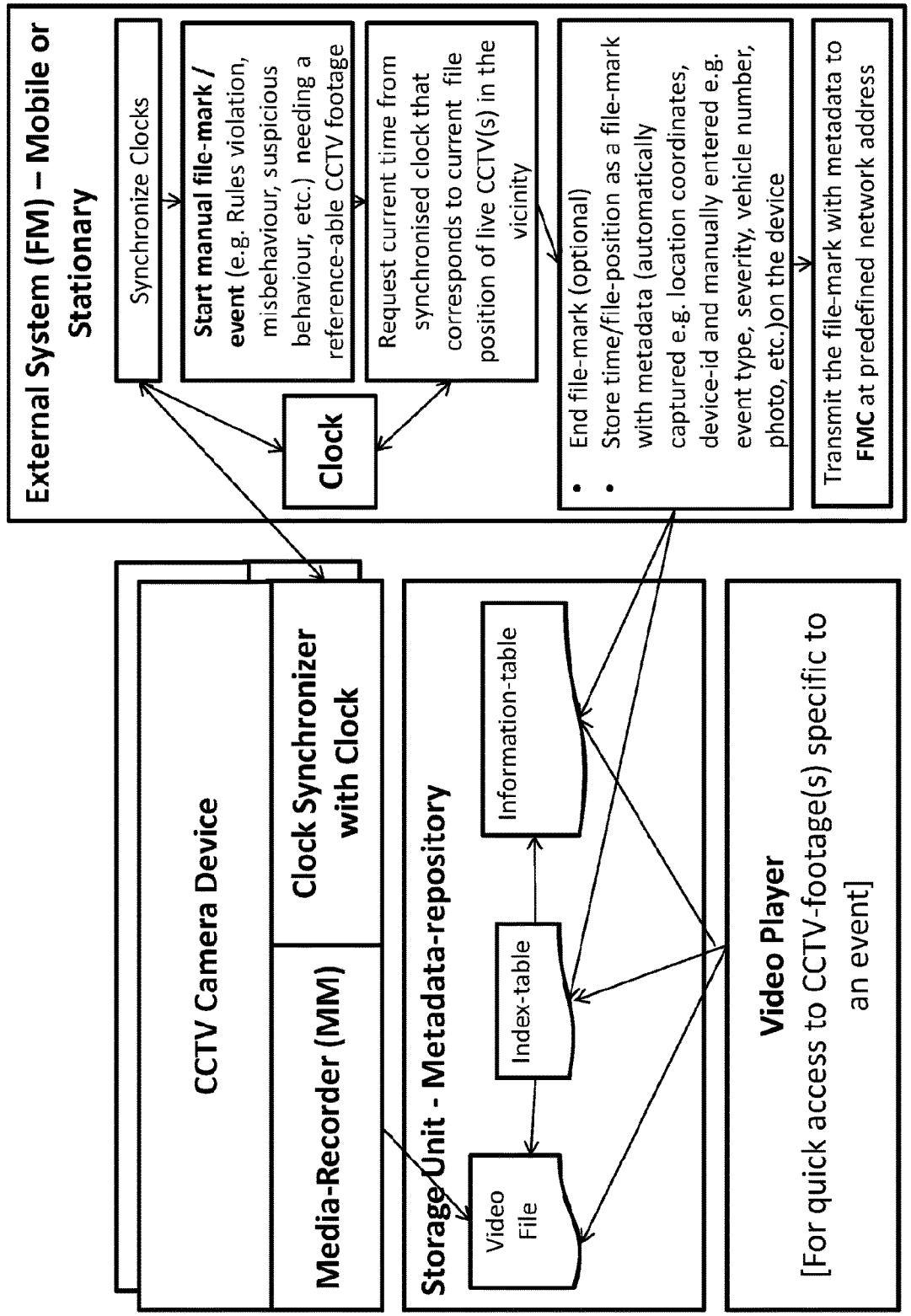
Figure 4: Manual File-marking on observed events

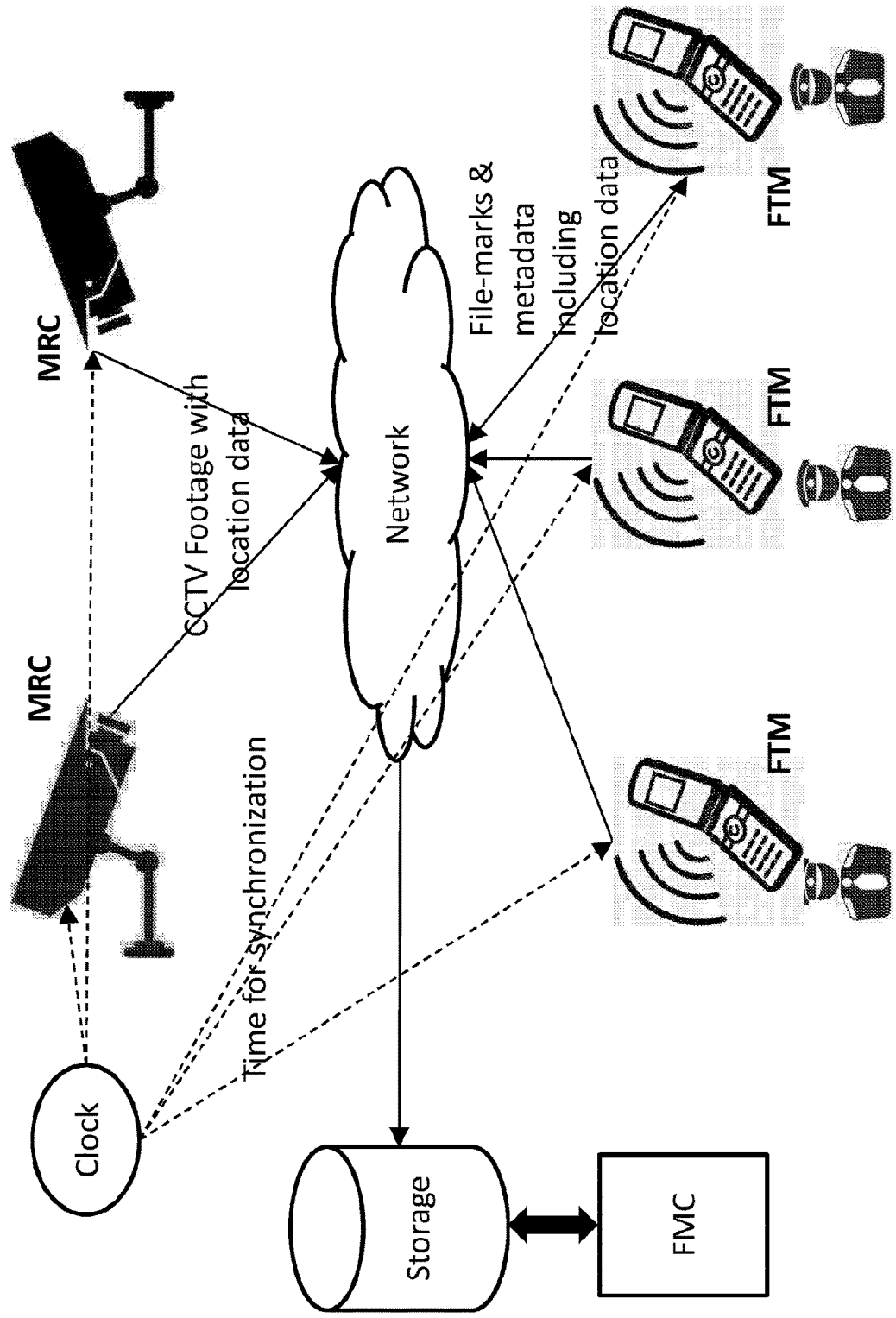
Figure 5: Manual File-marking on observed events by mobile devices

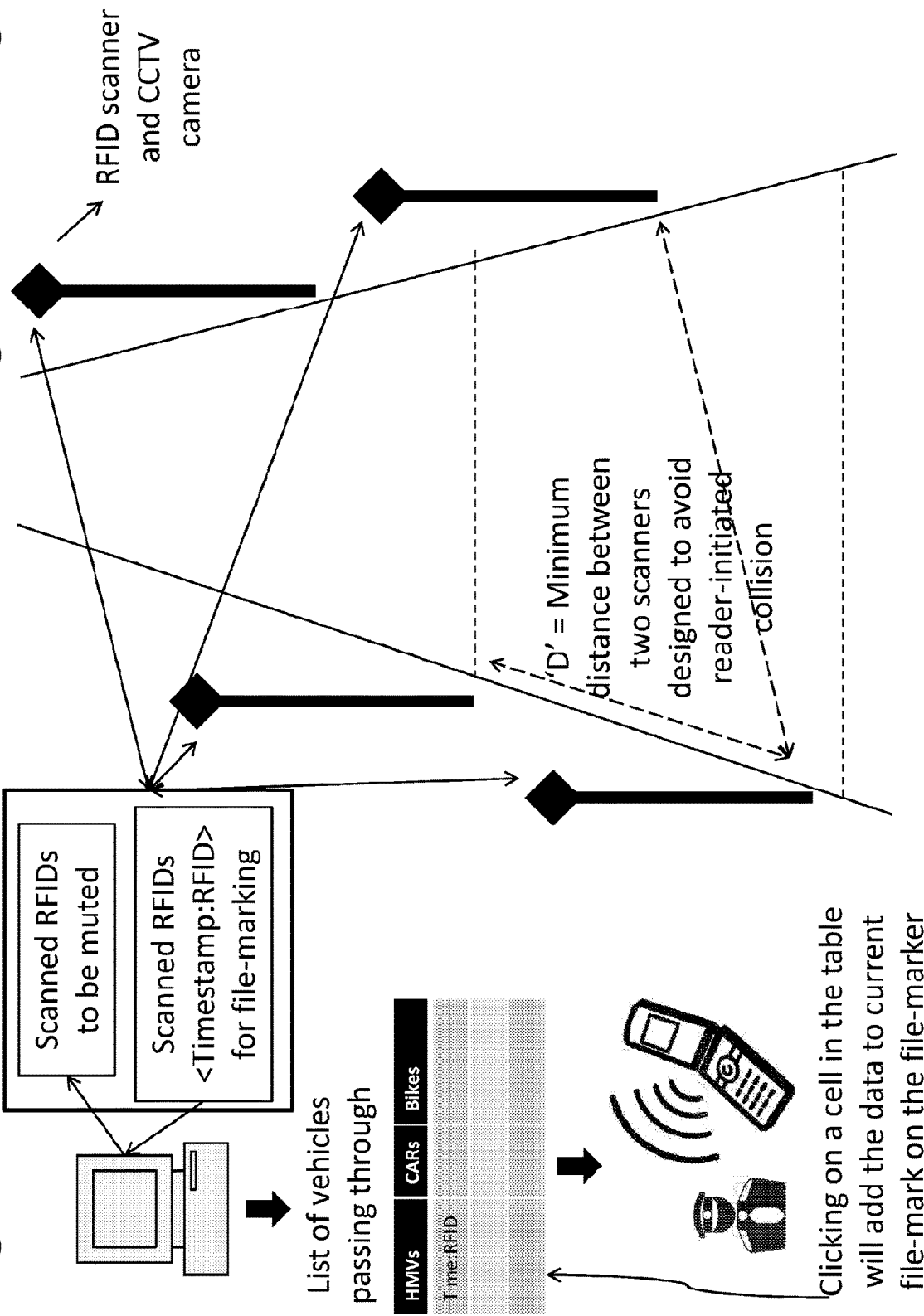

Figure 7 : Flow chart for crowd sourcing file-marks
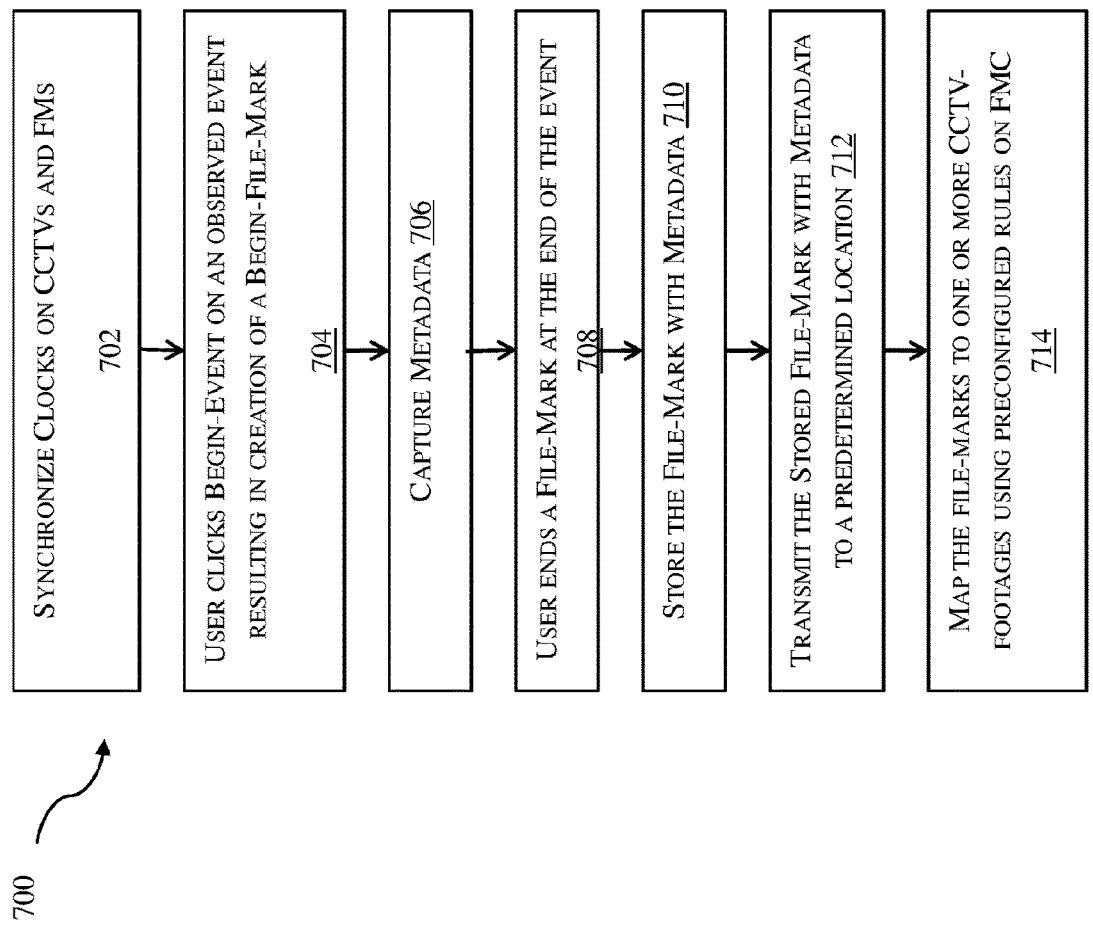

Figure 8a: Contents of Metadata Repository for a multimedia file

Metadata Repository

Index Table

| FMId | Begin FM | End FM |
|---|---|---|
| 1 | fm1 | FM1 |
| 2 | fm2 | FM2 |
| 3 | fm3 | FM3 |
| 4 | fm4 | FM4 |
| 5 | fm5 | FM5 |
| 6 | fm6 | FM6 |

Information Table

| FMId | Metadata |
|---|---|
| 1 | Priority=2, Scene=Comedy, Park |
| 2 | Priority=1, 'Morning walk' |
| 3 | Priority=1, Scene=Action |
| 4 | Priority=1, 'Rainy day' |
| 5 | Priority=2, Scene=Drama |
| 6 | Priority=1, 'College Scene' |

Metadata Table for Encoding

| FMId | Begin FM | End FM | Metadata |
|---|---|---|---|
| 2 | fm2 | FM2 | Priority=1 |
| 3 | fm3 | FM3 | Priority=1 |
| 4 | fm4 | FM4 | Priority=1 |
| 6 | fm5 | FM5 | Priority=1 |

Metadata Table for Navigation

| FMId | Begin FM | End FM | Metadata |
|---|---|---|---|
| 1 | fm1 | FM1 | Priority=2, Scene=Comedy, Park |
| 2 | fm2 | FM2 | Priority=1, 'Morning walk' |
| 3 | fm3 | FM3 | Priority=1, Scene=Action |
| 4 | fm4 | FM4 | Priority=1, 'Rainy day' |
| 5 | fm5 | FM5 | Priority=2, Scene=Drama |
| 6 | fm6 | FM6 | Priority=1, 'College Scene' |

Legend

| | |
|---|---|
| fmn | nth Begin-file-mark |
| FMn | nth End-file-mark |
| BOF | Begin of file |
| EOF | End of file |

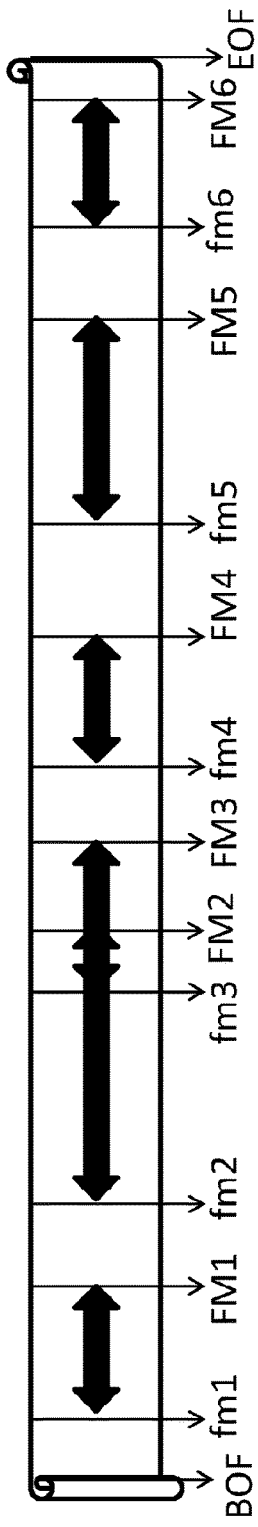

Figure 8b: Multimedia File with Highlights

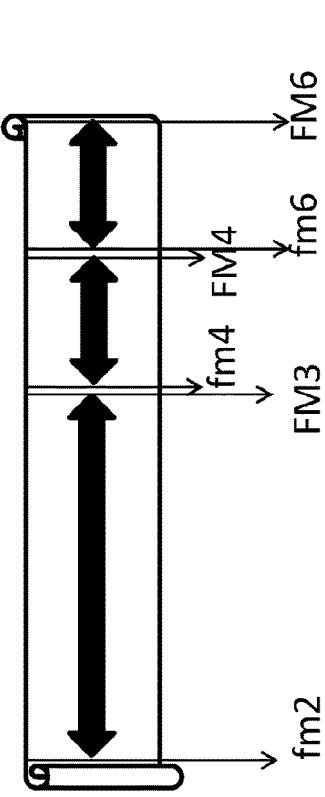

Figure 8c: Encoded File – Part1

*Predefined fixed-length byte offset indicating length of one or two metadata-tables*

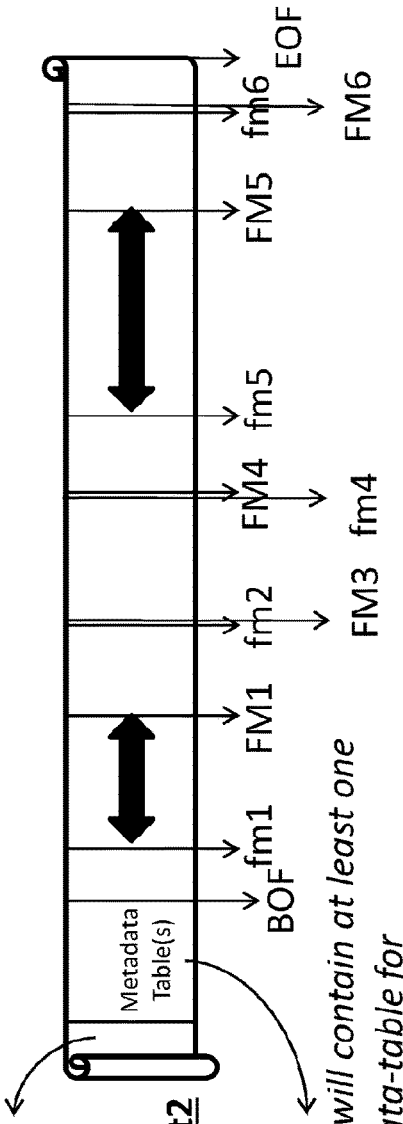

Figure 8d: Encoded File – Part2

*Metadata table(s) in part 2 will contain at least one for encoding, called 'Metadata-table for encoding/decoding' and another optional one for navigation called the 'Navigational-Metadata-table'*

ELECTRONIC SYSTEM AND METHOD FOR MARKING HIGHLIGHTS IN A MULTIMEDIA FILE AND MANIPULATING THE MULTIMEDIA FILE USING THE HIGHLIGHTS

RELATED APPLICATIONS

The present application claims priority from the provisional patent application 2059/CHE/2014 filed 22 Apr. 2014. The application has been disclosed herein for reference.

BACKGROUND

Technical Field

The present disclosure relates generally to multimedia technologies. More specifically, the present disclosure relates to a method and a system to facilitate marking, manipulation of highlights in multimedia files and also to qualify them with relevant metadata to enable search within the multimedia files.

Description of the Related Art

In the recent times, users have access to abundant multimedia content over the internet and through other channels such as television, radio, mobile devices, Digital Versatile Disc (DVDs), etc. This results in the user having to spend a lot of time filtering the content of interest. Also, searching through the abundant multimedia content to find the snippets that interest the user is very difficult and laborious. Search engines also search only for metadata associated to a multimedia file and hence do not help if one is searching for a snippet buried in a huge multimedia file. One way to search through the multimedia files is to associate metadata to various positions in the multimedia file. However just associating metadata to various positions in a file does not enable the users to quickly view a summarized version of the file in order to assess the relevance and appeal of the content. Even when the content is a video file recorded by a CCTV camera, it is important that viewer has the benefit of being able to watch only important and relevant sections quickly.

Also, the events that result in a CCTV footage to be of importance can come from various sources including people and a plurality of sensory devices, in addition to the recording device. Further, there is a growing need to optimize resource consumption such as storage needs and bandwidth consumption during distribution of multimedia files, since the channel for consumption is increasingly moving to mobile devices. Hence, there exists a need for a method and a system to facilitate processor-efficient marking of highlights in multimedia files and using the marked highlights to manipulate the multimedia files in order to facilitate effective searching, playing, filtering and distribution of multimedia files for relevant content. The system should additionally facilitate sourcing of metadata from a plurality of devices and people.

SUMMARY

The shortcomings of the prior art are overcome and many additional advantages are provided through the present disclosure. Additional features and advantages are realized through the techniques of the present disclosure. Other embodiments and aspects of the disclosure are described in detail herein and are considered a part of the claimed disclosure.

The present disclosure relates to a method and an electronic device to facilitate marking of highlights in multimedia files and to qualify the marked highlights with relevant metadata to enable search within the multimedia files. The present disclosure facilitates marking of highlights in a multimedia file using either manual or automated approaches. Different approaches are suitable under different usage scenarios as detailed in the description below. Manual marking of highlights and metadata enables a semantically richer search.

The methods described here-in further facilitate, crowdsourcing of the effort of marking highlights and identifying metadata, and automating the process of combining the crowd-sourced work in a manner that is relevant to the users. Further it enables distributing the task of highlighting to multiple users and devices simultaneously using a process of clock synchronization. The systems and methods also describe ways to usefully control the multimedia recorder-player's functionality using actions triggered on various events. In addition, the disclosure details a method of distributing highlighted multimedia files in bandwidth efficient manner using the created highlights to encode the files.

A method of marking highlights in a multimedia file being manipulated on a multimedia manipulation platform in an electronic device comprises (a) receiving at least one pair of file-marks from one or more file-markers, each pair of file-marks indicating a highlight in the multimedia file, comprising a begin-file-mark and an end-file-mark corresponding to particular locations in the multimedia file, and (b) storing the received file-marks in a metadata repository corresponding to the multimedia file. The one or more file-markers are (a) equipped with an interrupt handler to receive at least one of begin-file-mark and end-file-mark creation request and respond by creating requested type of file-mark using at least one of current time on a clock synchronized with the electronic device manipulating the multimedia file as the particular location for creating file-mark, (b) equipped to receive current file position of multimedia file being manipulated from the multimedia manipulator reacting to at least one of a received interrupt and processing preconfigured conditions being met by the data in the multimedia file (e.g. voice match, face identification, etc.), in terms of at least one of time-offset, byte-offset and number of frames from the begin of multimedia file, as the particular location for creating file-mark; and (c) configured to pair the created begin and end file-marks using predefined techniques.

The method further comprises the file-marker configured to (a) receiving or querying for one or more data elements from one or more user devices that may be different from the one that created the file-mark for associating with the at least one created file-mark, wherein the one or more data elements, referred to as metadata, denote attributes of the multimedia file at the file-mark position and also of file section at least one of preceding and succeeding the file-mark as per preconfigured rules and comprises at least one of pre-defined keywords with associated values, predefined tags and custom tags, where in the received data elements are at least one of static, in which case it is stored as received and dynamic, in which case the currently received data and previously received data are aggregated to arrive at new dynamic data using predefined techniques; and (b) storing the data elements as metadata in the metadata repository with association to at least one file-mark. The metadata for a file-mark can include track-ID e.g. voice track or data track, where applicable.

The methods further comprises initiating one or more preconfigured actions at the time of at least one of creating the file-marks, associating the one or more data elements with at least one file-mark, and manipulating the multimedia file at the file-marks, the predefined actions comprise at least one of hardware and software interrupts to initiate one or more processes that include: (a) dynamically editing the multimedia file being manipulated, (b) creating, computing or editing the associated metadata, (c) controlling operations of multimedia manipulator, by changing its behaviour, on one or more electronic devices, (d) performing internal processing, and (e) triggering external events.

The file-marker can be configured to pair the file-marks as per first-in-first-out logic, last-in-first-out, alternate begin and end file marks or as per manual selection.

The file-marker can be configured to interpret a missing begin or end file-mark in a pair to be at least one of (a) a configured distance from received end or begin file-mark, where the distance can be predefined in terms of number of frames, time-offset or byte-offset from the known file-mark, (b) the begin or end of multimedia file respectively, and (c) the end of the previous pair or begin of the succeeding pair of file-marks respectively.

The file-marks and highlighted sections of the multimedia file(s) may be directly accessed for manipulation without having to traverse the section of multimedia file between the current position and the selected file-mark or highlight.

The method further comprises storing file level metadata for a multimedia file by associating it with at least one of the file-mark denoting begin-position of the multimedia file and the file-mark identified by a predefined metadata; wherein the file level metadata is at least one of received, computed and read from the native format of the multimedia file.

The metadata for a multimedia file can be shared by many variant formats of the multimedia file by having each metadata set at a file-mark uniquely identified, where the unique identifier representing the file-mark is associated with one or more format types and particular location data specific to that format type.

The one or more users having access to a multimedia file can generate file-marks and metadata for the multimedia file and then grant access rights to the generated file-marks and metadata to one or more other users and user-groups in a multi-user environment.

The keyword values can be of predefined data-types including text, date, numbers, files (containing picture, audio, flash, video, etc.), pointers to external files, URL, URN, URI, pointers to other file-marks within the same multimedia file, pointers to file-marks in external files and arrays of the above data-types.

A sub-set of one or more file-marks and associated metadata from the metadata repository for a multimedia file is consolidated into one or more metadata-tables, using at least one of automatic and manual consolidation process.

The automatic consolidation is scheduled to be executed at preconfigured periodicity and includes incrementally consolidating the new one or more file-marks and associated metadata by one or more user devices, as determined by their creation time being greater than last consolidation time, based on predetermined criteria on file-level metadata (e.g. location-data), file-mark-level metadata (e.g. rating) and attributes of one or more users and devices that created the one or more file-marks and metadata.

The manual consolidation comprises providing an user-interface using which a user can search, as per user's access privileges, for one-or-more file-marks by using search criteria on at least one of metadata and profile attributes of devices and users' whose file-marks and metadata are of interest and then selecting a subset of searched file-marks and metadata to consolidate into a metadata-table.

At least one of file-marks and highlights in a metadata-table can be used to build at least one of a linear list (e.g. display-index) and a hierarchical list (e.g. table-of-contents) for the multimedia file to be used on the user-interface of the multimedia manipulator for the purpose of navigation and summarization of the multimedia-file, where in the file-marks and highlights are sequenced based on at least one of the position of file-marks and one or more predefined metadata (e.g. alphabetic ordering based on topic-name, user-created, priority, etc.), named by a predefined metadata and leveled in the hierarchical list based on predefined metadata.

The highlights in a metadata-table are used to automatically build a hierarchical list (e.g. table-of-contents) for a multimedia file to be used in user-interface of a multimedia manipulator to facilitate navigation and summarization of the multimedia file, where a predefined file-mark-level metadata is used as the name of the entry for that highlight, the sequence of a highlight is decided by at least one of the start position of the begin-file-mark of the highlight w.r.t other highlights and a predefined metadata at file-marks and the level of the entry is assigned such that (a) highlights that are nested within other highlights as defined by their start and end positions are considered to be one level lower with respect to the immediate containing highlight and (b) overlapping highlights are considered to be at the same level.

A search on metadata in metadata repository can result in one or more multimedia files and their associated one or more highlights and file-marks as per user's access rights which can be further short-listed, sequenced using file-mark-level metadata and saved as a play-list for at least one of playing the entries uninterruptedly using a single click, directly accessing play-list entries and sharing with other users.

The multimedia manipulator may be a search engine that indexes and searches web pages containing one or more multimedia files with associated file-marks and metadata represented as at least one of values for qualifying html-tags and contained in a file, a pointer to which is stored in a qualifying html-tag, such that any search using the search engine will result in a play-list of one or more multimedia files and also specific highlights and file-marks within the multimedia files that are associated with the data that was searched for.

The search engine may further rank the search results comprising of multimedia files and highlights and file-marks using predefined techniques based on at least one of (i) no. of times of occurrence of the searched string in the metadata, (ii) kind of metadata match (kinds being file-level or file-mark-level match that includes keyword-name and keyword-value match, keyword-value match, keyword-name match, predefined tag match and custom tag match); where in each kind is associated to a predefined weight and (iii) preconfigured set of dynamic metadata (such as rating, no. of shares, no. of votes, etc.), associated to the multimedia files and file-marks.

The one or more file-marks generated in real-time by one or more synchronised file-marking device(s) can be used to file-mark one or more multimedia files of one or more types being manipulated simultaneously by one-or-more multimedia manipulators with synchronised clocks, by mapping the generated file-marks to one or more multimedia files based on predefined criteria in addition to the following: (a) The creation time of file-mark being greater than the start-time of manipulating a multimedia file, and (b) The creation time of file-mark being less than the end-time of manipulating a multimedia file.

The interrupt-handlers of file-markers that generate file-marks and metadata are triggered, by agents that include at least one of one or more users manually using an user-interface and one or more linked systems automatically triggered on preconfigured events on the linked systems. The agents, in most cases, provide metadata for the file-marks triggered by them.

The predefined criteria to map a generated file-mark to one or more multimedia manipulators includes at least one of predefined rules on mapping at least one of metadata associated to file-marks, attributes of users and file-markers to one or more attributes of at least one of multimedia manipulators and multimedia files and predefined configuration data pairing one or more sets of one or more file-markers to one or more sets of one of more multimedia manipulators.

The mapped file-marks generated by the synchronised file-marking devices are adjusted to compute file-marks relative to the begin of a multimedia file, by subtracting the noted begin time of manipulating of the multimedia file from each mapped file-mark time created by the synchronised file-marker, so that the adjusted file-marks denote time-offset relative to begin of file.

The adjustment of the mapped file-marks, when multimedia manipulator can have one or more pauses during manipulation, further comprises (a) subtracting the start time of media manipulation from the absolute pause start and end times recorded by multimedia manipulator using synchronised clock, if pause times are not relative to begin of media file, (b) Changing a file-mark time to the begin of pause-duration if it corresponds to a pause duration, and (c) Subtracting all the pause-durations from the file-mark time, where the pause-end-time is lesser than the file-mark time.

The process of adjustment further includes converting the file-marks with time-offset from begin of file into at least one of no. of frames and byte-offset from begin of file, if the two are related and the media file is not encoded, using preconfigured conversion formulae.

The file-marks and metadata generated using an external file-marking device can be at least one of transmitted, mapped, adjusted and stored into the metadata-repository immediately and/OR consolidated into one metadata-table at the end of session in the same file-marking device, in order to be transmitted, mapped, adjusted and stored into the metadata-repository based on preconfigured rules that include metadata values of the file-mark(s) generated.

The method comprises use of a compression module to compress independently one or more highlight sections and one or more non-highlight sections of a multimedia file as defined by a selected metadata-table, by one or more compression techniques and parameters such that the compression techniques and parameters used for compressing highlights have lower latency as compared to the compression techniques and parameters used for compressing non-highlights, and storing the compression techniques and parameters as file-mark-level metadata, if different for each highlight and non-highlight and as file-level metadata, if same for all highlights and non-highlights, in the selected metadata-table.

The one or more compression techniques and parameters can be at least one of predetermined and a function of other predefined metadata associated with a given highlight and non-highlight (e.g. importance, priority, degree of motion, time of day, etc.).

The multimedia manipulator of a compressed multimedia file will use a decompression module to decompress the multimedia file using the metadata-table used for compression to determine the compression techniques and parameters to be used.

The method further comprises use of an encoder module to encode a multimedia file, where the process of encoding comprises generation of at least 2-parts of the multimedia file using a chosen metadata-table and a multimedia file, such that the first part of encoded file comprises a subset of highlighted sections of multimedia file as per the chosen metadata-table, where the subset is defined by predefined metadata at file-marks and the second part of the encoded file comprises the rest of the multimedia file including highlighted sections not in the first part and the non-highlighted sections combined together in the right chronological sequence and where the chosen metadata-table is included in at least one of the first and second part as per configuration.

When an uncompressed file is encoded, the process further consists of compressing the two generated parts independently using above defined [0033] compression techniques and parameters and storing the compression techniques and parameters as file-level metadata in the metadata file used for encoding.

The process of encoding further comprises including a second metadata-table in either the second part or first part of the encoded file and represented in the first metadata-table as if it were a highlight, so that the decoded file can be navigated and manipulated using the second metadata-table instead of the first metadata-table and the first metadata-table is used only for encoding, decoding and user sampling. When the second metadata table is included in the first part, it can be used for view only like table-of-contents.

The media-manipulator of an encoded multimedia file uses a decoder component that decodes the two-parts of encoded multimedia file using the metadata-table used for encoding, such that the first part of the decoded file can be manipulated by the user after decompression if required, before the availability of the second part or before commencement of decoding of second part of the file.

The multimedia manipulator of the multimedia file can be configured to request transmission of only first part of the encoded multimedia file. The multimedia manipulator can initiate a request for the second part of the encoded multimedia file on user request.

The method further comprises use of an 'Abridger module' to abridge a multimedia file by removing one or more non-highlighted and highlighted sections from the multimedia file based on preconfigured rules that include values of predefined file-level metadata (e.g. creation-date, last-access-date, location-data, priority, subscription-type, etc.) and values of predefined file-mark-level metadata (e.g. priority, no. of likes, rating, etc.) associated with the non-highlighted and highlighted sections.

A system for manipulating a multimedia file, the system being a multimedia manipulation platform comprising the following modules deployed on one or more electronic devices: (a) a multimedia manipulator module configured to perform one or more operations that include record, play, view, edit, compress, encode, abridge, modify metadata, copy, read, transmit, print, search and process one or more multimedia files equipped with at least one of an interrupt handler to provide the current position of the multimedia file being manipulated in response to an interrupt, a trigger manager coupled to file-marker to generate file-marking requests on preconfigured conditions in multimedia file and a clock synchroniser with a linked clock that can at least one of initiate a synchronization request and receive a synchronization request to synchronize its clock with at least one file-marker; and (b) a file-marker module equipped with an interrupt handler to receive at least one of begin and end file-mark creation request and is at least one of (i) equipped with a clock synchronizer with a linked clock that can at least one of initiate a synchronization request and receive a synchronization request to synchronize its clock with at least one multimedia manipulator and (ii) communicatively coupled with one or more multimedia manipulators to obtain the current position of the media file being manipulated; where in the file-marker is further configured to pair the created begin and end file-marks as per preconfigured rules.

The system further comprises one or more of the following modules deployed on one or more electronic devices: (c) one or more trigger management modules operationally coupled to at least one of the multimedia manipulator module and the file-marking module to initiate one or more preconfigured actions at the time of at least one of creating the file-marks, associating metadata to the file-marks and manipulating the multimedia file at file-marks; (d) one or more storage modules, wherein the storage module stores multimedia files, the one or more pairs of file-marks, associated metadata and various subsets of the file-marks and metadata; (e) a metadata aggregator module that computes new dynamic metadata using one or more static and dynamic metadata already received as per preconfigured techniques; (f) a file-mark consolidator module that transmits, maps, adjusts and creates subsets of created file-marks and metadata corresponding to one or more metadata files based on preconfigured rules; (g) a compression-decompression module configured to at least one of compress and decompress one or more multimedia files using file-marks and associated metadata using at least one of predefined and dynamically determined compression techniques and parameters; where dynamical determination of techniques and parameters is based on factors that include metadata associated to the multimedia file; (h) an encoder-decoder module, configured to at least one of encode and decode a multimedia file; where encoding results in at least two smaller parts of the multimedia file leading to lower latency during transmission from one device to another; (i) an abridger module configured to abridge a multimedia file by removing one or more sections of non-highlights and highlights based on preconfigured rules; and (j) one or more processing modules operationally coupled with the above modules.

The file-marker is further configured to represent the first file-mark also called the begin-file-mark, of a pair of file-marks in terms of at least one of time-offset, byte-offset and number of frames from beginning of the multimedia file.

The file-marker is further configured to represent the second file-mark, also called the end-file-mark, of a pair of file-marks in terms of at least one of time-offset, byte-offset and number of frames from at least one of beginning of the multimedia file and the first file-mark of a pair of file-marks.

The file-marker is configured to receive one or more metadata elements to be associated with the one or more file-marks and store them in a metadata repository, wherein the stored metadata comprises at least one of static metadata and dynamic metadata.

The file-marker is further configured to store file-level metadata as part of a file-mark that is at least one of identified by a predefined metadata and represents the begin position of the multimedia file; where in the file level metadata is least one of aggregated, received and read from the metadata associated to a multimedia file in its native form as defined by the operating system of the device storing the multimedia file.

The system further comprises initiating one or more preconfigured actions at the time of at least one of creating the file-marks, associating the one or more data elements with at least one file-mark by the file-marker, and manipulating the multimedia file at the file-marks by the multimedia manipulator, the predefined actions comprise at least one of hardware interrupts and initiation of one or more processes that include (a) dynamically editing the multimedia file being manipulated, (b) create or edit the associated metadata, (c) control operations of the multimedia manipulator, by changing its behaviour, on one or more electronic devices, (d) perform internal processing, and (e) trigger external events.

The multimedia file can be directly accessed for manipulation at the file position(s) denoted by one or more file-marks without the multimedia manipulator having to traverse the portion of the file between the current position and the directly accessed file-mark.

The encoder-decoder module facilitates encoding of a multimedia file, wherein the process of encoding comprises (a) selecting a metadata table associated to the multimedia file and at least one highlighted section from the one or more highlighted sections, wherein the at least one highlighted section corresponds to a highlight identified by predefined metadata in the metadata table and combining the selected highlight sections in a chronological sequence to form a first part of the encoded file; (b) Selecting the non-highlighted sections of the multimedia file and one or more highlighted sections of the multimedia file absent in the first part of the encoded file and combining the non-highlighted sections and the one or more highlighted sections in a chronological sequence to form a second part of the encoded file; and (c) including the metadata table in at least one of the first and second part of the encoded file.

The encoder-decoder module is further configured to use the compressor-decompressor module to compress the first part and the second part of the 2-part encoded file independently using at least one of dynamically determined and predefined compression techniques and parameters.

A subset of file-marks and highlights of a multimedia file can be arranged into at least one of linear and hierarchical lists as per preconfigured rules; wherein the lists are used by the multimedia manipulator to facilitate navigation and summarization of the multimedia file.

The aforementioned and other features and advantages of the disclosure will become further apparent from the following detailed description of the presently preferred embodiments, read in conjunction with the accompanying drawings. The detailed description and drawings are merely illustrative of the disclosure rather than limiting, the scope of the disclosure being defined by the appended claims and equivalents thereof.

BRIEF DESCRIPTION OF THE DRAWINGS

The embodiments herein will be better understood from the following detailed description with reference to the drawings, in which:

FIG. 1 illustrates a system for manipulating a multimedia file in one or more electronic devices, in accordance with an embodiment herein;

FIG. 2 illustrates a block diagram of the multimedia manipulation platform of FIG. 1, in accordance with an embodiment herein;

FIG. 2A illustrates components of the storage unit in accordance with an embodiment herein;

FIG. 2B illustrates a block diagram of the file-marker module in accordance with an embodiment herein;

FIG. 3 illustrates an exemplary system for automatic file-marking of the multimedia files, in accordance with an embodiment herein;

FIG. 4 illustrates an exemplary system for manual file-marking of the multimedia files, in accordance with an embodiment herein;

FIG. 5 illustrates another exemplary system for manual file-marking of the multimedia files, in accordance with an embodiment herein;

FIG. 6 illustrates an exemplary system for file-marking of the multimedia files using an RFID scanner, in accordance with an embodiment herein;

FIG. 7 illustrates a flow chart for crowd-sourcing file-marks, in accordance with an embodiment herein;

FIG. 8A illustrates a metadata repository for multimedia file 8B, in accordance with an embodiment herein;

FIG. 8B illustrates the multimedia file with file-marks as per 8A, in accordance with an embodiment herein;

FIG. 8C illustrates part-1 of encoded file, in accordance with an embodiment herein;

FIG. 8D illustrates part-2 of encoded file, in accordance with an embodiment herein.

DETAILED DESCRIPTION OF PREFERRED EMBODIMENTS

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

In embodiments, a method for manipulating a multimedia file on a multimedia manipulation platform that includes one or more electronic devices is provided. The term manipulation includes but not limited to one or more of the following operations: record, play. read, print, transmit, copy, process, search, encode/decode, compress/decompress, abridge or edit multimedia files, including edit of metadata. The method includes receiving one or more pairs of file-marks from one or more file-marker(s) deployed on one or more electronic devices, wherein the file-marks are used to create highlights on one or more multimedia files being manipulated on one or more multimedia manipulator devices and storing the one or more pairs of file-marks in a metadata repository corresponding to the one or more multimedia file(s).

The file-marker is:

(a) equipped with an interrupt handler to receive either a begin or end file-mark creation request and responds by creating a file-mark of the requested kind using either the time on a clock synchronized with a multimedia manipulator or the current position of the file being manipulated as provided by the multimedia manipulator in response to at least one of a received interrupt or on preconfigured conditions being met by the data in the multimedia file, in terms of at least one of time-offset, byte-offset and number of frames from the begin of multimedia file, as the particular location for creating the file-mark, and (b) configured to pair the created begin and end file-marks using predefined rules so as to create a highlight between each pair of file-marks, where in each pair of file-marks includes a begin-file-mark corresponding to a first location on the multimedia file, and an end-file-mark corresponding to a second location on the multimedia file. The preconfigured rules for pairing the begin and end file-marks can include but not limited to 'Last-In-First-Out', 'First-In-First-Out', based on matching metadata associated to the file-marks, etc. Pairing can also be achieved by providing a manual interface to select a file-mark of the required type from the available unpaired file-marks.

Further, the file-marker is configured to receive one or more data elements for associating with the at least one stored file-mark and storing the data elements in the metadata repository with association to at least one file-mark. The one or more data elements denote attributes of the multimedia file at the file-mark position and also of file section that is at least one of preceding and succeeding the file-mark as per preconfigured rules. Typically, the metadata associated to either of file-marks in a pair of begin and end file-marks describes the section of the media file between a begin-file-mark and end-file-mark. However, preconfigured rules can be different in different embodiments. For e.g. in one embodiment, each begin file-mark can store metadata that gives the length of the multimedia file from that point till the end of the file or it can store the count of people who have viewed the multimedia file at least till that file-mark.

In other embodiments, a file-mark could just denote a specific event at that position in the file, e.g. a goal in a football match. In some embodiments, the begin or end file-mark can be associated with metadata corresponding to an immediately preceding or succeeding non-highlighted section of the multimedia file and examples of this could be no. of views, or likes that section has received. For e.g. the metadata stored can indicate importance factor associated with the subsequent non-highlighted section which data can be used to create an abridged version of the multimedia file by excluding all non-important non-highlighted sections.

In an embodiment, it can also be used to store dynamic metadata such as compression techniques suitable or used on the non-highlighted section, count of how many times a non-highlighted section was viewed, etc. Metadata can come from one or more users or devices that may be different from the one that created the file-mark. Each metadata element can be considered to be at least one of static or dynamic type. Static metadata represents the data that is unprocessed and stored as received from the user or device providing it. Dynamic metadata on the other hand, represents data that changes with time and typically captures dynamic attributes of the file like no. of views, no. of votes, no. of shares a particular file section denoted by the file-mark has received. In case of dynamic metadata, the data received at any instant is combined or aggregated with previously received data to arrive at new data using predefined techniques. For e.g. Dynamic metadata 'average age' of the viewer of a multimedia file is computed by receiving the age of the current viewer and computing the average age by using the previously computed average age of the viewers and the number of viewers.

Metadata comprises of keywords, predefined tags and custom tags. Keyword values are provided by system or user and can be of predefined data-types including text, date, numbers, files (containing picture, audio, flash, video, etc.), pointers to external files, URL, URN, URI, pointers to other file-marks within the same multimedia file, pointers to file-marks in external files and arrays of the above data-types. The master-metadata repository consists of media category specific keywords and predefined tags, from which a subset can be chosen to be associated with a particular media-file.

In some embodiments, the method further comprises initiating one or more preconfigured actions at the time of at least one of creating the file-marks, associating the one or more data elements with at least one file-mark, and on encountering the file-marks during manipulation of the multimedia file. The predefined actions include one or more of a plurality of hardware interrupts and initiation of one or more processes that include but are not limited to a. dynamically editing the multimedia file being manipulated,
b. creating or editing the associated metadata,
c. control operations of multimedia manipulator on one or more electronic devices, by changing its default behavior
d. performing internal processing and
e. triggering external events
f. dynamically extract multimedia file snippets to be conveyed to preconfigured addresses.

The specific action chosen can be defined to be a function of metadata being associated, already associated and also one or more external factors or variables (e.g. slow-motion is selected on manipulator). Some of the examples of such actions include sending an email/SMS to an address determined by a predefined metadata or external variable, initiating a phone call, sending a section of predefined size of the multimedia file starting at the current file-mark to a preconfigured network address, computing file-mark metadata, changing CCTV resolution/direction based on source of sound, etc. The predefined actions can be called file-mark-time triggers, tag-time triggers and play-time or manipulate-time triggers, based on when they are initiated. Some of the examples for the actions include executing a trigger program, modifying at run-time the multimedia section after the current file-mark by prefixing it with another video section or flash video, by overlaying the multimedia section after the current file-mark with an image, flash-video or audio file, by skipping the current highlight if marked as 'Blocked' or 'Adults' by a metadata tag and if being watched by a minor user, or by jumping to a specific highlight based on the results of a trigger program, etc. File-mark-time triggers would be useful where every file-mark created requires some immediate action such as signaling an alarm, or sending an SMS in a very specialized and critical environment e.g. while file-marking an ECG for predefined abnormal data.

Further, the file-marker can be configured to interpret a missing begin or end file-mark in a pair to be at least one of
a configured distance from received begin or end file-mark, where the distance can be defined in terms of number of frames, time-offset or byte-offset from the known file-mark,
the begin or end of multimedia file and
a preconfigured distance (which can be zero) from the end or begin of the previous pair of file-marks In an embodiment, an unpaired file-mark can be represented or replaced by a begin-file-mark and an end-file-mark, such that the new file-marks are at equal distances from the unpaired file-mark, wherein the distance is preconfigured. In an exemplary embodiment, a highlight can be a portion of an image-file or a portion of a frame in a video file. In such cases, the file-marks can be represented using a combination of factors like no. of frames and byte-offset, or time-offset and byte-offset. In some embodiments begin and end file-mark could be represented using a combination of number of frames and 'x, y' coordinates, where x and y coordinates are defined in terms of length (mm, cm, etc.) or pixels.

Further, the method allows for defining file-level metadata in addition to file-mark-level metadata, where the file-level metadata is stored as part of a file-mark corresponding to begin of the multimedia file, or as part of a file-mark identified by a predefined metadata or tag. In an embodiment, the method involves reading the metadata associated to a multimedia file represented in the native format defined by the operating system of the device on which the multimedia file resides, and storing it as file-level metadata of the multimedia file in the metadata repository. The metadata stored at both file-level or file-mark-level can be considered to comprise of two components namely static metadata and dynamic metadata. Further the static metadata can be either user-defined or system defined, where the system defined metadata comprises all the metadata that can be provided automatically by the operating system of the media manipulator or file-marking device (e.g., date/time of creation, user-id of creator, etc.,) and any particular embodiment of the system configured to automatically record additional data (e.g. location-data, ID and type of device used for creating media file or file-marks, etc.). Similarly user defined static metadata at file-level or file-mark-level could comprise of data like access rights, copy rights, publisher, price of the media file and other data pertaining to or describing the content of the multimedia file. Dynamic metadata at file and file-mark level comprises dynamic information recorded by the media-player at the time of playing the media file and its associated file-marks and includes number of times of playing, replaying, liked, disliked, shared, average-rating provided to the file and its associated file-marks or highlights, etc. Dynamic metadata can be computed by play-time also called as manipulation-time triggers. Consolidation of dynamic metadata from many users using many devices can be done either in real-time at the server using a write-lock and FIFO queue, or the devices could periodically upload incremental data since last upload to be consolidated by a background process on the server. The choice of the method can be a function of the load (i.e., number of users, number of external devices generating dynamic data) and system configuration.

Further, in one exemplary embodiment, where a multimedia file is available in multiple media formats (e.g. motion JPEG, MPEG 3, MPEG 4, H.263, etc.), the system can be configured to use the one instance of metadata with multiple file formats. This is achieved by having each metadata set at a file-mark uniquely identified, where the unique identifier representing the file-mark is associated with one or more format types and particular location data specific to that format type.

In another embodiment, where one or more users have access to a multimedia file, the users can generate file-marks and metadata for the multimedia file and then grant access rights to the generated file-marks and metadata to one or more other users and user-groups in a multi-user environment. In an embodiment, the multiuser environment is a social network. In yet another embodiment, access rights are implied by system policies.

In one embodiment of the present disclosure, a single multimedia file can be associated with one or more metadata-tables comprising one or more file-marks and associated one or more data elements that are consolidated either automatically or manually from the metadata repository associated to the multimedia file. Each metadata-table can be used by one or more users as per defined access privileges. Automatic consolidation of a metadata-table includes consolidating the one or more file-marks based on predetermined criteria on file-level and file-mark level metadata and attributes of one or more users or devices that created the one or more file-marks. For e.g., all file-marks and metadata of a multimedia file belonging to users who are residents of India can be consolidated into one metadata-table. The consolidation process can be configured to be executed at predefined periodic time-intervals, where in each consolidation exercise records the date and time of consolidation, and the subsequent consolidation exercise uses the last consolidation time to retrieve new file-marks and metadata created after the last-consolidation time to perform an incremental consolidation.

In yet another embodiment of the present disclosure, manual consolidation of one or more file-marks is supported by providing the user with an user-interface capable of searching for a set of file-marks based on metadata of file-marks and one or more attributes of the users or devices that created the one or more file-marks and then allowing a selection of a subset of searched file-marks and metadata to be saved as a metadata-table. The user can use the metadata-table to navigate through the multimedia file. For e.g., user could watch all highlights in a metadata-table with a single click, without having to watch the non-highlighted sections. The user also will have a choice to persist the metadata-table in metadata-repository for later use by providing it with a name, share it with other users or discard it after the current session.

At least one of file-marks and highlights of a multimedia-file can be arranged to create a linear or hierarchical list to facilitate navigation and summarization of a multimedia file. For e.g. in an embodiment, a metadata-table can be used by a multimedia manipulator for creating a display-index or table-of-contents for a multimedia file to be used in the user-interface by the multimedia manipulator to facilitate easy navigation and visual summarization of the contents of the multimedia file. The entries in the display-index can be sequenced or ordered based on chronological sequence or on one or more predefined metadata elements (e.g. alphabetic ordering based on topic-name, user-created, priority, etc.). Similarly, a table-of-contents for a multimedia file can be either manually or automatically built, for using in user-interface, using a metadata-table. Automatic building of a table of contents includes using a predefined file-mark-level metadata as the name of the entry for that highlight, the sequence/order of a highlight is decided by the start position of the highlight and the level of a highlight assigned such that (1) highlights that are nested within other highlights as defined by their start and end positions are considered to be one level lower with respect to the immediate containing highlight and (2) overlapping highlights are considered to be at the same level.

Alternately the multimedia manipulator builds the table-of-contents for a multimedia file using two predefined file-mark-level metadata, one as the name of the entry and the other as level of the specific file-mark in the table-of-contents, and where the position of the file-mark in the table-of-contents indicates its sequential order in the media file. In one embodiment, the entries in metadata-table, display-index or table-of-contents can be ordered using a predefined file-mark-level metadata instead of the position of the file-mark. The highlights so arranged can then be played uninterrupted with a single click, by the user to get a summarized version of the multimedia file.

In the above embodiments, the file-marks and highlights in the multimedia file can be directly accessed for playing, editing, viewing and modifying metadata using entries in at least one of a display-index and table-of-contents built using metadata-table, linked to the said multimedia file, either sequentially or randomly.

In another exemplary embodiment, the user can construct a hierarchical play-list consisting of file-marks and highlights from one or more multimedia files. In order to build the play-list, the user could use search criteria on metadata to obtain a list of one or more media files with one or more file-marks and highlights that match the search criteria. In cases where the search criteria are met only at the file-level metadata, the entire file is assumed to be of relevance. The resulting search results can then be short-listed by the user and saved as a play-list. In one embodiment, the play-list can be ordered by the user, as required, and the ordering persisted using a metadata field, along with the play-list. The play-lists can then be played uninterruptedly using a single click and also used for sharing with other users. Here again, individual entries can be directly accessed for manipulation based on access restrictions.

In an embodiment with videos as multimedia files, each highlight can be visually represented using a frame, referred to as 'representative-frame', identified by a file-mark tagged with predefined metadata. In such embodiments, the display-index, table-of-contents and play-lists can use the image from a representative-frame to provide a visual or pictorial summary of the contents of the multimedia file, In some embodiments, a highlight can have more than one representative-frames, in which case, the first frame can be used when only one is to be displayed or needed. Further, representative-frame for the entire multimedia file can be one of the first representative-frame, from the highest rated highlight or identified using a different predefined metadata.

In one embodiment, one or more external file-marking devices can be used to file-mark one or more multimedia files being recorded, viewed or played simultaneously in real-time. In order to achieve this, the devices, namely, multimedia manipulator (e.g. media-recorder, media-viewer, media-player, media-processor, etc.) can respond with the current file-position of the multimedia file being manipulated (recorded, viewed, processed, searched or played), in response to a request for the same from one or more external file-marking devices, to enable the external devices to use the returned file-position as a file-mark. This is achieved by the multimedia manipulator being equipped with a interrupt handler to receive the requests for current file position and then respond to the request. The current file-position returned can be in terms of byte-offset, time-offset or number of frames from the begin of the multimedia file.

In still another embodiment of the present disclosure, in cases where file-marks are defined in terms of elapsed time from begin of file or where the number of frames or byte offset is derivable from the elapsed time using a predefined algorithm, file-marks can be created by one or more synchronized external file-marking devices in real-time on one or more multimedia files being manipulated (recorded/played/processed) by a multimedia manipulator (recorder/player/processor). The file-marks so generated are mapped to a specific multimedia file based on the time of file-mark generation with respect to time of manipulating (recording or playing) the multimedia-file. All file-marks mapped to a specific multimedia file can then be consolidated into one metadata-table.

When one or more external file-marking devices are used to file-mark one or more multimedia files being manipulated (recorded/played/processed) in real-time by a multimedia manipulator (recorder/player/processor), all the devices use synchronized clocks for file-marking, i.e., the external file-marking devices use time on their clock that is synchronized with that of the multimedia manipulator to generate file-marks. Also, the multimedia manipulator (recorder/player) notes the start-time and end-time of manipulating (recording/playing) each multimedia file using a synchronized clock, preferably as file-level metadata. In some embodiments, start and end times, especially of playing a multimedia file, can be recorded in a different storage location e.g. in a transient media-player memory with predefined life-span or availability time, instead of being part of the file-level metadata. Further, in embodiments where the multimedia manipulator (recorder/player) is allowed to pause one or more times in between during recording/playing, the pause-start and pause-end times are also noted by the multimedia manipulator (recorder/player). The generated file-marks are then mapped to a specific multimedia file and adjusted with the start-time and pause-durations of recording/playing the mapped multimedia file before storing them into the metadata repository.

The external file-marking devices can be either operated manually or be linked to external systems that automatically trigger file-mark generation on preconfigured events and also provide relevant metadata to be associated with the generated file-mark. The linked external systems could be software systems like an ATM or billing system that trigger a file-mark generation at the begin of every transaction, real-time systems e.g. speed enforcement system triggering file-marking on speed violation, hardware sensors connected to Analog-to-digital-convertors that create file-marks when sensed data is out of predefined normal range, bar-code/FRID/QR-Code scanners, magnetic swipe card readers, control systems, real-time systems, etc. The linked external systems could also be in the form of voice, sound, face/image, text or data-stream recognition systems that have been input samples of voices, sounds, images or text to be recognized and generate file-marking interrupts/requests to the file-marker when a match is found in the multimedia file being manipulated. The external data recognition system could additionally search for the input data in a specified track of the multimedia file. The external system can be additionally fed with metadata associated with each sample data, so that the created file-marks on finding the sample data in the multimedia file can be tagged with the associated metadata corresponding to the data sample. For e.g. A voice recognition system can be fed samples of peoples' voices with associated data such as Name or ID of the person, so that every time that particular person's voice is found in the multimedia file, the voice recognition system requests the file-marker through an interrupt, to tag the multimedia file with the metadata (e.g. name or ID) associated with the voice sample.

In some exemplary embodiments, the multimedia manipulator itself could trigger a file-marking request to the file-marker on preconfigured conditions or based on user input. For example, the multimedia manipulator could take on the role of search by accepting samples of data to be matched in the multimedia file, in one or more tracks of the multimedia file if applicable, and on finding a match, send the current position of the media file being manipulated along with any associated metadata for the preconfigured condition and the track-ID, if available, to the file-marker for creating file-marks. Thus within a single multimedia file, a filemark can be created on a specific track of the multimedia file, e.g. voice track, video track, etc. When filemark is tagged with track-ID, a search can be made for filemarks on only a specified track, e.g. every time the voice of the person 'X' is heard.

The process of mapping a file-mark to a specific media file manipulated by the multimedia manipulator comprises the following steps:
1. Comparing the file-mark creation time with the start-time of manipulating (recording/playing) of the one or more multimedia files by the multimedia manipulator (recorder/player) and picking the media file with the latest start-time that is earlier than the time on the file-mark and
2. If the end-time of recording/playing is present, implying that the recording/playing has already been completed, the file-mark time is checked to be lesser than the end-time noted.

In another exemplary embodiment, a single file-mark generated by one external file-marking device can be mapped to one or more multimedia files of one or more types being manipulated (i.e. recorded, processed, edited or played) simultaneously by one or more multimedia manipulator (recorder or player) devices. In one embodiment, a multimedia file can be defined as having at least one of one or more audio tracks, one or more visual tracks and one or more data tracks with respect to time, either all in a single file being manipulated on one multimedia manipulator or in a collection of related files being manipulated on one or more media manipulators. Each multimedia manipulator can trigger a file-marking request to a file-marker on finding a match of the configured sample in predefined track. The file-mark created will then be mapped to one or more specific multimedia files based preconfigured rules in the file-mark consolidator (FMC) module. In one embodiment, the preconfigured rule could be to map all file-marks only to a designated primary multimedia file, where as in another embodiment, the rule could result in mapping a file-mark to one or more media files of a specific kind (e.g. video only) being manipulated.

Another exemplary embodiment with one or more external file-marking devices creating file-marks on one or more media files being manipulated simultaneously by one or more multimedia manipulators would be in cases where multiple CCTVs are recording simultaneously to cover a secure area from various angles and places. File-marking can be done by multiple policemen or security-guards for example. In such a case, the process of mapping a file-mark to a media file comprises comparing file-mark metadata with file-level metadata or some other predefined data using predefined criteria, especially location data. In this embodiment, the mapping process comprises of the following steps at the minimum a. Location proximity as defined by location-data of the file-marks and location data of recording/playing the multimedia files, as recorded in file-level metadata or in a predefined storage location to be within a predefined threshold b. The creation time of file-mark being greater than the latest start-time of recording/playing the one or more multimedia files meeting condition (a), and c. The creation time of file-mark being less than the end-time of recording/playing the multimedia files, if present The mapping process can be further based on one or more attributes of multimedia manipulator (recorder/player) that includes directional-orientation and range of view, as recorded in some storage, file-level metadata or file-mark level metadata, if varying, and time on file-marks from the external file-marking devices. In some embodiments the mapping process can be also based on one or more attributes of the user or device generating the file-marks or even be based on metadata associated. For e.g. users with a certain privilege or subscription type could be allowed to generate file-marks for some CCTV footages or some videos played in a multi-room conference.

The mapped file-marks recorded by the external file-marking devices are then adjusted to generate file-marks that are relative to the begin of the multimedia file they are mapped to. The process of adjusting the file-marks mapped to a particular multimedia file comprises of the following steps:

1. Subtracting the noted begin time of manipulating (recording/playing) of the multimedia file from each mapped file-mark time created by the synchronized external file-marking device, so that the adjusted file-marks denote elapsed time from begin of file.

2. In embodiments where multimedia manipulator (e.g. recorder, player) can have one or more pauses during recording/playing, adjustments further comprises (assuming that the pause times are relative to the begin of recording/playing the media files):

a. Changing a file-mark time to the begin of pause-duration if it corresponds to a pause duration,
    b. Subtracting all the pause-durations from the file-mark time, where the pause-end-time is lesser than the file-mark time 3. In embodiments where file-marks use no. of frames or byte offset to define file-positions, the process of adjustment further includes converting the file-marks with relative time from begin of file into at least one of no. of frames or byte-offset from begin of file using pre-configured conversion formulae.

The file-marks and metadata generated using an external file-marking device can be transmitted, mapped, adjusted and stored into the metadata-repository immediately after generation or consolidated into one metadata-table at the end of session in the same external file-marking device, in order to be transmitted, mapped, adjusted and stored into the metadata-repository. The decision to immediately transmit the generated file-marks or defer it till end of session can be based on priority of the file-mark as determined by configured metadata.

When using external file-marking devices as explained above, the process of synchronization of clocks of two or more devices comprising of multimedia-manipulators (recorders, players, processors, etc.) and external file-marking devices involves one of the following methods:

a. Master and Slave clocks: In this method, one of the devices is designated as having the master clock and others as slave devices, and the slave devices request for current time from the master clock at predefined periodicity. The returned time is used to reset the slave device's internal clock after adjusting the received time with a preconfigured adjustment factor to accommodate any expected transmission delay from the master device to the slave device. In an embodiment, the preconfigured adjustment factor for delay could depend on the communication protocol used, bandwidth of the communication channel, a number of slave devices interacting with the master device, etc.

b. GPS-Time: All the devices use GPS-time to synchronize their internal clocks at a predefined periodicity c. Internal clocks: Most devices these days already come with pre-built time synchronization features that make their internal-clocks precise enough for most file-marking needs, thus eliminating the need for any special synchronization infrastructure. Thus, using an internal device clock, particularly using a mobile phone as an external file-marking device will meet the required precision. However, this method can be resorted to in the absence of availability of the above two methods.

In one embodiment of the present disclosure, further comprises using compressor module to compress one or more highlight sections and non-highlighted sections of one or more multimedia files by predetermined compression techniques and storing the predetermined compression techniques as file-level or file-mark level metadata associated with the compressed one or more multimedia files. Here, the compression of each highlight and each un-highlighted section is done independently such that there is no reference to any frame or data from other highlights or un-highlighted sections. This allows using different compression techniques on different sections. In fact, the method allows using different compression techniques on different highlights based on some predefined metadata for e.g. priority of a highlight, time of day, amount of action, color, etc. Highlights or high priority highlights could use compression techniques that have low latency and are loss-less, as compared to low priority highlights and non-highlighted sections. This ensures optimized bandwidth when transmitting files over network, and also optimizes storage requirements, especially storage of CCTV-footages while enabling a faster decompression of high priority highlight sections. One of the embodiments of the present disclosure, further comprises using an encoder module to generate a 2-part encoded file, such that part-1 of the file comprises of the metadata-table along with a subset of compressed highlights, where the subset is defined based on predefined file-mark-level metadata. The part-2 of the file will comprise the rest of the multimedia file excluding the highlights included in part-1, and including compressed highlights not in part-1 and compressed un-highlighted sections. Care has to be taken to ensure that any overlapping or nested highlights are not split between the 2 parts, but are in either of the two parts of the encoded file. Also, while encoding any overlapping or nesting highlights in both part-1 and part-2 of the encoded files, there is no repeat of any multimedia section in the encoded file.

In another embodiment, the encoder generates a 2-part file, such that part-1 of file comprises of metadata-table along with a subset of un-compressed highlights, where the subset is defined by predefined file-mark-level metadata.

The part-2 of the file will comprise the rest of the multimedia file excluding the highlights included in part-1 and including un-compressed highlights not in part-1 and un-compressed un-highlighted sections combined in the right chronological order. Once the 2-part file is created, each part is independently compressed using predefined compression techniques that could be same or different for each part. This approach is better suited for compression techniques that use object-based encoding e.g. MPEG-4. Here again, the choice of compression technique for part-1 uses low latency and high quality criteria, while the choice for part-2 uses low-bandwidth and small-file-size as criteria since latency is better tolerated.

Encoded files are decoded by a decoder component on the media player. When using files encoded in 2-parts as above, a remote player can request for only part-1 of the file, so as to enable the user to play/view the highlights, and assess his/her interest in that media file, while downloading, or even before downloading the part-2 of the encoded media file. This can save considerable time and bandwidth for the user and also allows the user to sample more media files and pick more relevant ones for use. User can also download only part-1 of the encoded file and initiate a separate request for download of part-2 of the file.

Alternately, in a different embodiment, the encoder can be configured to use two metadata-tables, one for encoding/decoding the media-file for transmission and user sampling, while the second metadata-table can be used for navigating through the decoded media file at the receiving device. In this case, the first metadata table is in part-1 of the encoded file and defines the highlights to be encoded in part-1 and the second metadata-table is included in the beginning of part-2 of the encoded file, and is represented as a highlight in the first metadata table. The 'Decoder' module in the receiving device uses the first metadata table for decoding the 2-part file. The second metadata-table is used after decoding of the file for the purpose of navigating through the multimedia file. Here again, the compression techniques can be applied independently on highlights and un-highlighted sections of the media file as per the first metadata table before splitting the file into 2-parts, or the media file can be first spilt into 2-parts as per the first metadata table, and then the two parts of the file can be encoded using predefined compression techniques, where the compression techniques used could be different for first and second parts of the file.

In some embodiments, the system could use an abridger module, to abridge a media file by removing the non-highlighted sections, especially for CCTV-footages, based on some file-level metadata such as date of creation and file-mark-level such as importance. For e.g., abridger could be configured to remove low-priority highlights as identified by predefined file-mark-level metadata in order to reduce storage consumption, file-transmission time and bandwidth. Such a abridging technique could also be useful to store old medical records in large hospitals by removing insignificant sections of digital medical records that have been file-marked for significant events for e.g. in an ECG/EEG file.

FIG. 1 illustrates a system for manipulating a multimedia file using a multimedia manipulation platform comprising software modules, firmware modules, hardware modules or a combination of these on one or more electronic devices, in accordance with an embodiment herein. The term manipulation includes but not limited to recording, creating, editing, viewing, playing, processing, transmitting, printing, searching, tagging or manipulating any metadata, etc. The term multimedia file includes, but is not limited to serialized data over time axis (e.g., graphs, electronic forms, etc.,) audio, animation, video, flash-videos, slide-shows, eBooks, text, electronic files, medical recordings like ECG, Echocardiogram, EEG, MRI-Scan, CT-Scan, PET-Scan, Nuclear-Scan, MEG-Scan, MRS-Scan, ultrasound, etc., and interactivity content forms. In an embodiment, a multimedia file can be composed of one or more tracks like video, audio, text, color histogram, other types of data, etc.

The system includes a plurality of electronic devices 106, the plurality of electronic devices 106 having electronic devices 106-1, 106-2, 106-3, etc. The plurality of electronic devices 106 is communicatively coupled to a network. Further, the system includes a multimedia manipulation platform 102. The term multimedia manipulation, as described herein, refers to multimedia content recorded, created, edited including edit of metadata, played, processed, printed, searched or transmitted between the one or more electronic devices and the multimedia manipulation platform. The multimedia manipulation platform 102 is communicatively coupled to the plurality of electronic devices 106 via the network. Examples of the multimedia manipulation platform include, but are not limited to cameras, video cameras, Closed-circuit television (CCTV) cameras, televisions (TVs), mobile phones, smart phones, cellular phones, tablets, Personal Digital Assistants (PDAs), laptops, desktops, gaming devices, navigation systems and any other electronic devices capable of manipulating multimedia files that can include recording, playing, searching, processing, printing, transmitting and displaying data including metadata in a multimedia file. In an embodiment, the multimedia manipulation platform 102 is a multitier structure, and may comprise of one or more electronic devices, each implementing one or more modules of the multimedia platform. Examples of the electronic devices 106 include mobile phones, smart phones, PDAs, tablets, desktops, laptops, TVs, TV-Remotes, gaming consoles, navigators, printers and any other electronic devices that can accept user input. In an embodiment, the electronic device 106 could be a multimedia-manipulation platform in itself or implement one or more modules of the multimedia manipulation platform. Thus, the electronic devices are capable of either manipulating multimedia files or are equipped with a clock synchronized with the multimedia manipulation platform 102. The electronic devices could be stand alone devices or connected via a network. Examples of types of the network 104 include, but are not limited to WiFi, a local area network, a wide area network, a radio network, a virtual private network, an internet area network, a metropolitan area network, a wireless network, and a telecommunication network. Examples of the telecommunication network include, but are not be limited to a global system for mobile communication (GSM) network, a general packet radio service (GPRS) network, third Generation Partnership Project (3GPP), an enhanced data GSM environment (EDGE) and a Universal Mobile Telecommunications System (UMTS). It is to be noted that in the context of the present invention, a communicative connection between the file markers and the multimedia manipulation platform may also be established via one or more of communication channels such as but not limited to Wi-fi, Bluetooth, Infrared communication etc., in addition to LAN and WAN. Further, the communication can be established using a combination of one or more above listed technologies.

In an embodiment, the system is a multiuser distributed network or a social networking system. One or more users are connected to each other using the plurality of electronic devices through the network. Examples of electronic device include, but are not limited to a cell phone, a smart phone, cameras, a video camera, a laptop, a desktop, a television, a cellular phone, a cellular mobile phone, a personal digital assistant (PDA), a wireless email terminal, a laptop, a tablet computer and other electronic device capable of processing, accepting input, storing and displaying data. The plurality of electronic devices is configured to create one or more pairs of file-marks to represent highlighted sections of a multimedia file. Each pair of file-marks includes a begin-file-mark corresponding to a first location on the multimedia file, and an end-file-mark corresponding to a second location on the multimedia file. The first location corresponds to beginning of a highlight of the multimedia file. The second location corresponds to the end of the highlight of the multimedia file.

In an embodiment, the electronic device 102, as depicted in FIG. 2b, is a file-marker device (FM) configured to create one or more pairs of file-marks such as Begin-File-mark and End-File-mark to indicate highlighted sections of a media file. In order to do this, the electronic device is equipped with an interrupt handler to receive file-mark creation requests from a user through an user interface or through one or more external system(s) preconfigured to generate file-mark creation requests on preconfigured events. On receiving a file-mark creation request of either begin or end type, the FM uses either its synchronized clock time or sends a request to the multimedia manipulator (MM) that could be part of multimedia manipulation platform 102 or on a second electronic device 102, for a file position and uses it to create the file-mark requested. Further the FM receives metadata either provided by the user or the external system to associate to the created file-marks.

FIG. 2 illustrates a block diagram of the multimedia manipulation platform 102 of FIG. 1, in accordance with an embodiment herein. In an embodiment, the one or more components are present in a single electronic device. In another embodiment, the one or more components are present in one or more electronics devices connected over the network 104, including embodiments where a single module may be split across multiple electronic devices. The block diagram of the multimedia manipulation platform 102 of FIG. 1, includes a media-manipulator module (MM) 200, file-marker module (FM) 210, a trigger manager module (TM) 220 communicatively coupled to at least one of MM 200 of FM, a metadata aggregator module (MA) 230, a file-mark consolidator (FMC) 240, a compressor-de-compressor module (CD) 250, a encoder-decoder module (ED) 260, an abridger module (AM) 270, one or more storage modules 290 and one or more processing modules 280—communicatively coupled to the above modules.

Multimedia Manipulator module 200, also referred to herein as MM 200, as the name suggests, refers to a module that is configured to manipulate a multimedia file, where in the term manipulation includes but is not limited to record, create, edit, copy, play, process, print, view, compress, decompress, encode, decode, abridge, search and any other type of processing of a multimedia file. In different embodiments different kinds of manipulation can be done by different devices or a single device could perform one or more kinds of manipulation. The multimedia files include, but not limited to, video files, audio files, image files, eBooks, slide-shows, serialized data on time-axis like graphs, interactive electronic documents/forms that capture input data in text, graphical, visual, audio or other forms, medical recordings like Electrocardiogram (ECG), Echocardiogram, EEG, MRI-Scan, CT-Scan, PET-Scan, Nuclear-Scan, MEG-Scan, MRS-Scan, ultrasound, etc., and other forms of electronic documents, including simple text files.

The MM 200 may be a video camera or a CCTV camera for a video file, medical equipment for medical records or it could be a software editor for a document, a gaming device for videos, flash-files, animated images, a printer for graphical data files, etc. The MM 200 is further configured to attach associated metadata to the created multimedia file either automatically or manually by a user. Automatically attached metadata could include user, date-time, location coordinates, etc. User specified data could include keywords with values and tags that describe the content of the media file. The file level metadata is stored with the multimedia file as per device's operating system format and also sent to file-marker module (FM) to be stored with the file-mark level metadata for that multimedia file.

In some embodiments, MM 200 could trigger file-marking requests based on user input from an user-interface or based on certain conditions being met in the data of multimedia file. Typically MM 200 will also be providing metadata for the file-marks in such a case. For e.g. MM 200 could be search module that accepts user input in the form of text, image, video-clip, sound track, data, etc., to be searched in a multimedia file and/or a specific track of a multimedia file, and trigger a file-marking request on finding a match.

The storage unit 290 is configured to store the multimedia files uploaded or created by the MM 200 and associated metadata therein. In one embodiment, the storage unit 290 comprises one or more sub-units such as a media-repository 294, metadata repository 298, a master-metadata repository 292, and a trigger repository 296. Master-metadata-repository stores media category specific keywords and pre-defined-tags that can be used to provide a list of options to the user at the time of metadata addition. Trigger repository stores configuration data for triggers like mapping of specific metadata to specific trigger-actions that can be used at the time of adding metadata (tag-time triggers) or playing file-marked media (play-time-triggers). It also can store mapping of trigger programs that will be invoked on various user actions like using different controls on the user-interface. Metadata repository stores one or more file-marks and associated metadata for one or more multimedia files. The physical representation of metadata repository can include, but is not limited to, xml-files, flat-files or database tables. Further, the physical representation of file-marks can be different from that of the associated metadata. The stored metadata is linked to a specific multimedia file by storing the multimedia file identifier (for e.g. URI of multimedia file) along with the metadata in the metadata repository as file-level metadata. In some embodiments, the linkage between media file and metadata repository can also be implemented by storing the metadata repository ID in the operating system attributes of the multimedia file.

In one exemplary embodiment of the present disclosure, metadata repository in a storage unit is configured to store file-marks of a multimedia separately from the metadata associated to the file-marks. File-marks are stored in a data-structure called index-table that is different from the data-structure used to store the associated metadata called information-table. The physical representation of the index and information tables can be in the form of database tables, XML files, flat files or any similar formats. Further, in one exemplary embodiment, where multiple media formats (e.g. motion JPEG, MPEG 3, MPEG 4, H.263, etc.) have to be dealt with, the system can be configured to use the same metadata or information-table with multiple file formats. Since each format could have different location data for the same file-mark, each file-mark is uniquely identified in an index-table and is qualified with one or more media formats along with file-mark location data for that specific format. Metadata in the information-table can then be used with any media format, by referring to uniquely identified file-mark in information-table to access the index-table and file-mark location for that media format in the index-table. Alternately, this representation can be viewed as identifying a set of metadata corresponding to a file-mark using a unique identifier, where the unique identifier representing the file-mark is associated with one or more format types and particular location data specific to that format type.

In an exemplary embodiment, a multimedia file appearing on a web/html page can be qualified by an xml representation of the file-marks and metadata using suitable extensions to html syntax, such that a search engine can index the metadata while crawling the web page containing the multimedia file. In some embodiments, the multimedia file on a web/html page can be qualified by special html tag, whose value contains a pointer to file that contains file-marks and metadata associated to the multimedia file. In an embodiment, the special html tag can point to web-service that will provide file-marks and metadata associated to the multimedia file for indexing. When a user then searches for data contained in the metadata of a multimedia file so represented on the web page, a search engine will be able to show in the search results the multimedia file and also specific multimedia highlight (s) and/or file-mark (s) whose metadata matches the searched data.

Further, in an embodiment, the system will facilitate creation of multiple subsets of file-marks and metadata associated with a media file. These subsets could either be virtual or have a physical representation. In this document, such a logical representation of a subset of file-marks and metadata is called a metadata-table. For e.g., an editor could create a curate list of file-marks and metadata on a multimedia file by choosing file-marks and metadata from index and information tables, resulting in an editorial metadata-table that can be sold for a price. In multiuser embodiments where file-marks and metadata are owned by specific users, users can have the rights to grant access of their file-marks and metadata to one or more users or user-groups. Alternately, access rights can be implied by system policies, e.g., when the multiuser system is a social network, all network connections of a user can be given access rights to the user's file-marks and metadata by default. When metadata is access restricted, users can only use file-marks and metadata they have access to, to create a metadata-table. Similarly, metadata-tables can also have access restrictions as per creator's specification.

The File Marker Module (FM) 210, also referred to as FM 210 is configured to create one or more file-marks denoting a particular location in the recorded multimedia files. The FM 210 is configured to denote a file-mark in terms of elapsed time or byte-offset from the begin of multimedia file, that is, in terms of number of bytes from begin of file (i.e., byte offset from BOF) or in terms of number of frames from begin of file or a combination of the above if required. The FM 210 is equipped with an interrupt handler to receive a file-mark creation request either from user input through a suitable user interface such as keyboard, touch screen, mouse, etc., or from an external device programmed to generate interrupts on preconfigured conditions. On receiving an interrupt, FM 210 uses current time on a clock synchronized with one or more MMs 200 to create a file-mark or sends a current file-position request to one or more MMs 200 as per preconfigured rules, and uses the returned current file-position(s) to create one or more file-marks.

Further, the FM 210 associates one or more data elements as metadata to the created file-mark. The metadata elements can be provided by the file-marking device (e.g. creation time, location-coordinates, logged-in user id, etc.,), user through an interface or the external system that triggered the file-mark creation (e.g. transaction-id, sensed/scanned data, etc.).

A file-mark can be of two types, a begin-file-mark and an end-file-mark. FM 210 creates either of them based on the kind of request received or based on predefined rules, e.g. every request is alternately treated as begin or end file-mark creation request. Further, FM 210 is configured to pair a begin-file-mark and an end-file-mark according to predefined rules or user input such that the pair denotes a section of the multimedia file representing a highlight, with the begin-file-mark denoting the beginning of a highlight and the end-file-mark denoting the end of a highlight. A highlight indicates a particular section of the recorded multimedia file of users' interests. The predefined rules for pairing file-marks could be to pair created begin and end file-marks using First-In-First-Out (FIFO) or Last-In-First-Out (LIFO) logic or only pair immediate neighbors leaving file-marks without an appropriate neighbor unpaired. In some embodiments, subsequent to pairing a begin and an end file-marks; the end file-mark is adjusted to be relative to the begin-file-mark instead of being relative to the begin of multimedia file. When a begin-file-mark occurs without a corresponding end-file-mark, the end-file-mark is assumed to be the end of the multimedia file. Similarly, when an end-file-mark is added without a corresponding begin-file-mark, begin of the multimedia file is assumed to be the begin-file-mark. Alternately, the missing file-mark can be assumed to be at a predefined distance from the specified file-mark, where in the predefined distance can be configured in terms of time-offset, byte-offset or no. of frames. In another embodiment, a missing begin or end file-mark can be assumed to coincide with the previous end-file-mark or the next begin-file-mark respectively. In yet other embodiments, an unpaired file-mark can be represented or replaced by a begin-file-mark and an end-file-mark, such that the new file-marks are at equal distances from the unpaired file-mark, wherein the distance is preconfigured.

Metadata associated to a file-mark describes the attributes of the section of file that at point of file-mark and also optionally describes the section that either precedes or succeeds the current file-mark. Typically, metadata associated to a begin-file-mark and end-file-mark is used to store the attributes of the multimedia file section between the two file-marks denoting a highlight. Additionally, based on pre-configured rules, they can also be used to store attributes of a file-section that is not a highlight but is immediately succeeding the current highlight.

The metadata associated to a file-mark comprises a collection of data elements, including but not limited to, predefined keywords with associated values, predefined tags, and custom tags. The predefined keywords can be chosen from a list and accepts a user specified value for the chosen keyword. For example, keywords could comprise words like Description, Location, Actors, Occasion, etc., which can be linked to a user specified value. In one embodiment, the system can automatically input the keywords. The list of keywords provided by the system can be a function of the category of the multimedia file. Thus keywords metadata is actually a name-value pair of entries. The tags on the other hand are single values. Tags can be of two types, system predefined or custom tags. System predefined tags are available as an enumerated list that a user can choose from. Custom tags, on the other hand are user entered values separated by commas Here again, the list of system predefined tags can be a function of the category of the multimedia file. In one embodiment, the file-marks need not be associated to any metadata at all.

Multimedia metadata can be divided into file-level and file-mark level metadata, each of which will further consist of Static and Dynamic metadata. File-level metadata can reside in the multimedia file as per format defined by the device's operating system, in addition to being stored as metadata for the first file-mark or a file-mark identified by a predefined tag.

File-level Static metadata contains (i) details of the media-file (e.g. Name, URI (URL, URN), location of creation, publisher, creator, price, etc.), and (ii) descriptive metadata describing the content of the media file (e.g. Movie-type, Actors, etc,). Some of these could be automatically provided by the s/w system or h/w device creating the media file, for e.g. location can be automatically computed by a GPS enabled camera. Dynamic metadata includes data that changes with time after every manipulation, e.g. playing and comprises data such as no. of times the file was played, liked, disliked, shared, accrued average-rating, etc., that is player recorded through play-time triggers invoking system computation.

File-mark level metadata also contains two components, namely, Static metadata and Dynamic metadata. File-mark level static metadata can be either user defined data or system provided data. Static metadata can include any kind of data-types like voice-tags, pictures, flash/video files, pointers to predefined types of data-objects e.g. pointers to other file-marks within the same media file or outside, URIs to external files, etc. System provided metadata will be automatically inserted by the h/w or s/w components like video editor-player or any other MM 200, file-marking devices, etc. These could include user-id, device-id, device-type, location-coordinates of the media creator, location co-ordinates of the file-marking device, file-marking device date/time, etc. There can also be custom defined automatic metadata insertion by a file-marking device or media-creator, for e.g. CCTV device ID, CCTV-address, CCTV-time & device-time of a file-marking device at begin-of-day, etc. Dynamic metadata includes data that is MM 200 or player recorded through play-time triggers invoking system computation and includes data like no. of times played, edited, liked, disliked, average-rating, average-age of viewer, etc.

In one embodiment, the FM 210 is configured to store the metadata associated with a non-highlighted section of the multimedia file as part of the begin or end file-mark just succeeding or preceding the non-highlighted section. For e.g. when a user likes or dislikes a multimedia file while playing a non-highlighted section, it can be interpreted as dynamic metadata for the non-highlighted section and stored in association with the end-file-mark of the previous highlighted section. Similarly, in an embodiment, any metadata related to compression techniques and parameters used on a non-highlighted section can be stored with the begin-file-mark of the next highlight.

Furthermore, the FM 210 is configured to trigger one or more actions, called tag-time triggers, at the time of associating the one or more data elements with a file-mark, the actions include either hardware interrupts to or initiation of one or more processes by either the FM device or the device storing the data. In some embodiments, configured actions, called file-mark-time triggers, can be triggered at the time of file-mark creation, even before tagging of metadata. The actions initiated can be a function of the metadata being associated to the current file-mark in addition to other metadata already associated to the file-mark or even based on some other factors or variable values. In some embodiments, the FM 210 could be configured to trigger actions at the time of file-mark generation that include either hardware interrupts to or initiation of one or more processes by either the device creating file-marks or the device receiving the file-marks.

In one embodiment, the FM 210 is configured to trigger one or more actions or tag-time triggers based on metadata attached to the file-marks and based on subscription data stored in the metadata repository when associating the metadata to the corresponding file-mark. The one or more actions may be stored in a trigger repository and can include hardware interrupts to the processing unit or software processes to be executed by the processing unit. For e.g. In a knowledge management website, members can subscribe to pre-published tags pertaining to their interests, and when any media file is tagged with the subscribed tag, the subscriber is notified about the event along with the media file and file-mark details though an email. In another embodiment, tagging of a CCTV-footage from a control-room or a mobile device for an emergency event could trigger actions that could be sending change resolution, direction, zoom-in, zoom-out instructions to the linked CCTV-camera, automatic transmission of the file-marks, metadata and optionally media section pertaining to the file-marks/highlight to a remote network-address, automatic notifications like an email, SMS or telephone call, sounding an alarm, etc.

The FM 210 could either be a software component within a multimedia manipulator (e.g. media-recorder, media-player) or an external physical device configured to create file-marks on media being recorded or played in the vicinity. When external devices are used, there can be one or more file-marking devices or FMs for a single MM 200. Also, a single FM can be used to file-mark multiple media files being recorded or played simultaneously by other devices. For e.g. multiple mobile devices can be used to create file-marks in real-time for one or more CCTV-footages being recorded by CCTV-cameras in the vicinity. In such cases, the time on file-marking devices have to be synchronized with that of the media recorder(s)/player(s).

Synchronization of FMs and MMs 200 are achieved by designating one of the devices playing the role of an MM 200 or FM 210 as having a master clock, whose time is used to reset the time of the other devices in the system or platform. Synchronization can be initiated by the slave device, requesting for a time-stamp from the master device that will be used by the slave device to reset its clock after adjusting the received time with a preconfigured delay. The delay adjustment is to take care of time difference between the times the master device send out the time, to the time the slave device actually receives the transmitted time. This may be a function of various factors like the communication protocol used, availability/bandwidth of the communication channel, no. of slave devices talking to the master device, etc. Hence it will have to be calibrated for each setup individually.

In one embodiment, the FM 210 or alternatively referred as file-marker devices could be various kinds of scanners (e.g. barcode, RFID scanners) or sensors like temperature sensors, etc. that are configured to capture time-stamp of their scan/sense activity along with the usual scanned or sensed data, using the synchronized time. Such file-markers facilitate file-marking a media file being recorded in the vicinity, like on a CCTV-footage, with the scanned or sensed data. Every scan or sense activity could result in a new file-mark, or there can be a middleware that filters the data to create file-marks only for specific data scanned/sensed using pre-configured data, algorithms or a combination of the two. In some configurations, one or more scanners/sensors could be attached to a single file-marking device. Care has to be taken to see that the scanners/sensors, if not equipped with a synchronized clock, transmit the scanned/sensed data to the file-marker with near zero latency, so that the time on the file-marker can be used to create file-marks.

In some embodiments, the file-marks created by external file-marker are transmitted by a module called 'File-mark Consolidator' (FMC) to a predefined network location, either immediately or at periodic scheduled intervals. This is done so as to enable playing the media files with the generated file-marks after mapping them to the right media file(s) and adjusting them to be relative to the begin of mapped media file(s). The decision of the time to transmit the file-marks and metadata could be based on the nature of application and also be a function of the metadata associated (e.g. priority of the file-mark).

The Metadata Aggregator (MA) 230, also known as the MA 230 aggregates all the dynamic metadata and sometimes static metadata generated by one or more users using one or more devices to generate new dynamic metadata to be useful. The system for aggregation can be implemented in multiple ways and the choice of the method can be based on number of users and devices, connectivity between devices and the server, system performance, etc. One method would be to aggregate data in real-time as and when it is recorded or received, by relaying the updates to the central server which queues all the received updates using a FIFO queue and updates data using a write-lock on already aggregated data. Alternately, the file-marking devices can upload metadata computed or recorded by it periodically to the central server. The server can then periodically aggregate the received data incrementally by using data received since last consolidation time and the stored values of the metadata to compute new metadata or edit existing metadata. Typical examples of metadata aggregation would be to compute average rating, average age of viewers, ranking of locations from where the multimedia file was viewed, scoring of highlights based on number of overlapping highlights by other users, etc. Computation techniques to be used for each kind of aggregated metadata element can be preconfigured in the MA 230. Typically, if it is real-time aggregation, Metadata Aggregator 230 is triggered as a tag-time action by the File-Marker (FM). 210 Else, it can be implemented as a batch job with preconfigured rules.

File-Mark Consolidator (FMC) module 240, also known as FMC 240 consolidates one or more file-marks and metadata on one or more multimedia files received from one or more users and one or more file-marking devices or FMs 210 into subsets called metadata-table(s) based on preconfigured rules. In one embodiment, where system allows users to define access restrictions on file-marks and metadata, consolidation is based on access privileges of the consolidating user and access restrictions on file-marks and metadata. In some embodiments, where external file-marking devices or FMs 210 generate file-marks on one or more multimedia files of one or more types being manipulated by one or more multimedia manipulators (MM) 200 simultaneously, the FMC 240 performs an additional process of mapping the generated file-marks to one or more multimedia files. The file-marks mapped to specific multimedia files can then be consolidated into metadata-tables as needed. The consolidation process thus involves mapping all file-marks to one or more multimedia files, selecting a subset of file-marks and associated metadata for a given media-file, sorting them based on their relative positions in the media file and then creating a metadata-table either for persisting it for later use or as a transient structure to be used for playing and navigating through the media file. In an embodiment, system can allow users to define access restriction on the metadata-table as well. File-marks' selection and hence consolidation process can be performed either manually by a user or automatically by the system based on predefined criteria on file-mark metadata, attributes of the users or devices that generated the file-marks, etc. For e.g. Automatic consolidation can be used to create a metadata table from crowd sourced file-marks based on predefined criteria on dynamic metadata at file-marks like rating, number of likes/shares, creation/modification time-stamp, etc., and also based on user/device attributes. When automated, the FMC 240 enables the consolidation to run at a fixed time in a day or run periodically though the day as a background job and build metadata tables incrementally by automatically selecting new file-marks since last consolidation time that match the predefined criteria.

The FMC 240 is further configured to facilitate a manual consolidation option by providing a user-interface to search for file-marks based on metadata, attributes of users or devices that created the file-marks, etc., and selecting a subset of the searched file-marks and metadata to build the metadata-table. Manual consolidation can be used for e.g. to create a curated editorial metadata table or a personal favorites list, etc. FMC 240 further facilitates editing of a metadata-table created either automatically or manually to add or remove file-marks and metadata. System can optionally assist such an edit by listing file-marks and metadata added after a certain date, e.g. after previous metadata-table edit.

In one embodiment, the FMC 240 can facilitate consolidation of file-marks and metadata on one or more multimedia files. When consolidation involves more than one media files, the resulting list is called a play-list. User can use the play-list to play or navigate through the list and also persist it for later use or sharing with other users. Play-lists can also have access restrictions defined by users creating them. When creating a play-list, a single search operation can be used to search multiple multimedia files for matching search criteria on metadata. The resulting search results containing a set of multimedia files, where each file in turn can contain matching set of highlights, are made available to the user as a selectable list. In cases, where the search criteria is matched at file level and no matches were found at file-mark level, the entire multimedia file is assumed to be relevant to the search criteria defined. The user can then choose a sub-set of the search results to create a play-list. The user has the option to play/watch the play-list uninterruptedly with a single click operation. In case of video files, transition between videos or highlights of videos can be indicated with video title or a designated keyword-value at the file-mark as the case may be, if available.

As discussed, when multiple time-synchronized file-markers are used to file-mark multiple media-files of one or more types being manipulated on multiple devices, generated file-marks will have to be mapped to one or more specific multimedia-files. Mapping of file-marks is done by the FMC 240. Mapping is usually based on criteria that involve time, location proximity of file-marker to the multimedia manipulator and sometimes other factors like directional orientation and view-range/pan of the multimedia manipulator (e.g. recorder, player) and file-marking devices. It may also be based on predefined mapping rules that maps file-marks with specific metadata or from specific devices to specific multimedia files or multimedia file-types on specific multimedia manipulators. It may also involve user and device attributes where applicable. Thus, typically mapping of file-marks to one or more multimedia files of one or more types being manipulated by one or more multimedia manipulators involves at least one of:

1. mapping of file-marks to one or more multimedia manipulators based on preconfigured rules and then mapping of file-marks to one media file manipulated on that multimedia manipulator based on time of file-marks and time of multimedia manipulation
2. mapping of file-marks to one or more multimedia files based on preconfigured rules and based on time of file-marks and time of multimedia manipulation. Thus mapping file-marks to one or more multimedia files involves in the least
   (i) Time of file-mark being greater than the start-time of manipulation of a media-file and
   (ii) Time of file-mark being lesser than end-time of manipulation of a multimedia file.

In addition, preconfigured rules can be used to map file-marks to multimedia manipulator(s) or multimedia file(s) and include but not limited to one or more of the following:
   (i) Using predefined mapping rules to associate metadata of file-marks, file-marker device attributes or user attributes to attributes of multimedia manipulators or multimedia file(s). Examples include using
   a. Predefined threshold on location proximity as defined by location-data of the file-marks and location data of manipulating the multimedia file(s),
   b. Directional orientation of the multimedia-manipulators and file-markers,
   c. Predefined operational range of the multimedia manipulators and file-markers
   (ii) Predefined configuration data pairing one or more sets of one or more file-markers to one or more sets of one of more multimedia manipulators Once the file-marks are mapped to a specific media file, they have to be adjusted in order to be relative to begin of the media file. The process of adjustment involves (assuming that the pause-times are recorded as absolute time):
   a. Changing a file-mark time to the begin of pause-duration if it corresponds to a pause duration,
   b. Subtracting all the pause-durations from the file-mark time, where the pause-end-time is lesser than the file-mark time
   c. Subtracting the start-time of manipulating (e.g., recording/playing) the media-file from the file-mark time.

In cases where number of frames and byte offset is used to denote file-marks and where a time-offset can be converted to number of frames or byte offset using a predefined formulae, the file-marks generated by the external file-marking devices can be converted to file-marks represented using number of frames and byte-offset.

In some embodiments, when a plurality of users generate highlights on a multimedia file, particularly in a crowd sourcing fashion, the MA 230 or FMC 240 can be further configured to score each highlight of each user based on number of overlapping highlights by other users it has and store the score as part of metadata for the highlight. Such scores would become part of the dynamic metadata for a highlight. This scoring can be restricted only to highlights having a size lesser than a predefined value to eliminate large highlights that can end up having too many overlaps due to sheer size. Also, additional refinements to scoring can be achieved by restricting the scoring only to cases where the size of the overlap with any other highlight is greater than a predefined percentage with respect to the size of highlight being scored. In some embodiments, the metadata associated to the scored highlights can also be scored based on the number of occurrences of the metadata element in the overlapping highlights. Further, the FMC 240 can be configured to generate a crowd-sourced metadata-table of popular highlights from the scored highlights using a predefined number of top scoring non-overlapping highlights. Such a process of scoring and metadata-table generation automates the process of combining crowd sourced highlights into a useful metadata table. Further, the generated metadata-table can be further enhanced by including top-scoring metadata elements related to the highlights in the crowd-sourced metadata-table. Alternately, the metadata can be manually selected from any of the associated static or dynamic metadata already associated to the overlapping highlights by an editor. The resulting highlights and metadata, thus will be the result of a combination of crowd-sourcing and editorial selection.

In one embodiment of the present disclosure, the system further comprises an FM 210 or MM 200 configured to initiate one or more actions on the event of creating the file-marks (file-mark-time triggers), associating metadata (tag-time triggers) and manipulating (e.g., playing) multimedia file at the one or more file-marks (manipulation-type triggers), the actions include either hardware interrupts to or initiation of one or more software processes by the media player. The act of triggering these actions is managed by one or more Trigger Manager (TM) modules 220, also referred to as TM 220 communicatively coupled to at least one of MM 200 or FM 210. Further, the mapping of specific action(s) to be triggered at any of the above events based on various factors like user/device attributes, value(s) of metadata, type of user control triggering the event, etc., is stored in a trigger repository that the TM(s) 220 have access to. The file-mark-time triggers or tag-time triggers are typically initiated by FM 210 or storage unit 290, while manipulation-time triggers are initiated by the MM 200.

In typical embodiments, the MM 200 manipulates or plays the multimedia file section by section, where each section is demarcated by a file-mark. Playing one section at a time is achieved by extracting a portion of the file by the MM 200 to be played each time, or using a time-based interrupt to stop manipulating/playing at a time corresponding to the length of the section in terms of time-offset. Manipulation-time triggers are invoked at the begin or end of each section of the multimedia file as per preconfigured rules. Most commonly used manipulation-time trigger is to display metadata associated with currently playing highlight in a distinguishable format from the rest of the metadata for the media file, either on the media file or on a separate panel, in the form of text, hyperlinks, user-controls, etc. For e.g., overlaying of metadata over the multimedia file in a html page can be achieved through cascading style sheets (CSS) with various styles for different methods of rendering like text, speech, print, brail, etc., wherein the rendering styles and methods can also be part of metadata of the multimedia file. MM 200 further is typically equipped with many user controls, including display of file-marks and highlights using suitable representations on the user interface to help in navigating through the media file using the metadata. File-marks and highlights can be represented with icons on the progress bar, image highlights at file-mark through a bordered outline or shading of the highlighted/non-highlighted section along with an indicator on the progress bar in case of image highlights in a video, and so on. User controls can be in the form of buttons, icons, hyperlinks, etc., for e.g., jump to the next or previous file-mark/highlight using a user control like a button, replay current or a specific highlight, replay a highlight with a different play speed. e.g. slow-motion replay and play only (selected) highlights skipping all the other sections of the media. User interface itself can be of many different kinds including touch-screen, graphical user interface, with mouse and/or keyboard, voice operated, etc. Manipulation-time triggers can be used to alter the default behavior of these user controls as per preconfigured rules. MM 200 can also use a metadata-table, Display-Index or Table-of-contents for manipulating/playing, instead of using the complete set of metadata associated to a file, to assist in navigating through the media file. Also, MM 200 facilitates creation of a play-list with highlights or file-marks from one or more multimedia files. The entries in the display-index and table-of-contents can be accessed directly by the MM 200 for manipulation based on user selection, without having to manipulate or traverse the media file sequentially. The manipulation-time triggers are initiated even when sections of media file are directly accessed by the MM 200.

In some embodiments, the TM 220 is configured to initiate one or more play-time triggers from the trigger repository only on encountering preconfigured metadata or metadata-types at file-marks being played. The trigger could invoke execution of a specific program subroutine or some hardware event, change the behavior of the player and player's controls, etc. The choice of specific action can be a function of one or more metadata, user or device attributes, user actions, environmental factors/variables like play-time, play-channel, etc. For e.g. Skip a highlight marked as 'Censored' while playing for users from certain countries as defined in a predefined variable containing 'Censored country list' An e.g. for changing behavior of user controls is when 'Skip to next highlight' or 'fast-forward' is prevented from skipping or going beyond a file-mark tagged as 'Important' until that file-mark is played at least once. In a video tutorial embodiment, a file-mark can be used to administer a quiz, and based on the score/response obtained by the user, the media-player can jump to a specific file-mark. Clicking on predefined metadata at a file-mark can also be used to jump to specific file-marks. Another example would be when an ad-break file-mark or highlight is played, trigger can increment a counter (dynamic metadata at file-mark) denoting the number of times the ad was viewed v/s being forwarded or skipped. Alternately, depending on the subscription-type or other user attributes, skipping, forwarding or sharing a file-mark or highlight, tagged as 'ad-break' or 'important' or 'copyrighted' could be disabled respectively. Skipping or forwarding can be disabled until the 'ad-break' or 'important' highlight is viewed at least once. In one embodiment, viewing of a specific file-mark/highlight, referred to as ad-break file-mark/highlight, could trigger the event of displaying an over-laid ad, or editing the media file section after the file-mark to insert an ad-file containing video, flash or image data. The choice of the ad-file can be also dynamically made in real-time based on other metadata associated to the file-mark, e.g. if the scene is identified as 'romantic' by a metadata tag, ads from that category can be picked for display, where the choice of specific ad from that category can be based on bid amount linked to the ads for that category. In an embodiment, categorization of ads can also be achieved by linking them to suitable metadata. In an embodiment, each ad-break can be suitably identified and qualified by metadata including minimum bid-value, and can be bid for by ads. In some embodiments, particularly in cases of live telecast e.g. a cricket match, the bidding can be done for metadata associated to file-marks e.g. four, six, bowled, etc., instead of bidding for identified ad-break file-marks. In such an embodiment, file-marks with that specific metadata will become ad-break file-marks. The choice of an ad-file for an ad-break file-mark/highlight is then based on the highest bid amount and matching of metadata of the ad with that of the file-mark. In an embodiment, the matching of metadata can be scored to indicate the extent of match using predefined techniques/algorithms based on factors that include at least one of (i) number of matches and (ii) the kind of match, which may be at least one of: keyword-name and keyword-value match, only keyword value match, only keyword name match, predefined-tag match or custom-tag match and wherein each kind of match is associated to a predefined weight.

In an embodiment, the choice of the position of display for an overlaid ad, can be determined by the multimedia manipulator, based on least amount of colour variation. Another example is where 'share' option could behave differently based on metadata, for e.g. sharing a copyrighted highlight can result in sharing a link to the original media, whereas, sharing un-copyrighted highlights could send actual file section. The MM 200 also computes and stores, predefined Dynamic metadata at media file-level and file-mark level using triggers. Dynamic metadata could include data related to number of times a file or file-mark/highlight was liked, played, shared, skipped, replayed, etc.

Compressor-De-compressor (CD) 250, also referred to as CD 250 is configured to compress one or more sections of multimedia files comprising highlights and non-highlight sections, independently by predetermined compression techniques and compression parameters and store the predetermined compression techniques and parameters as file-level or file-mark level metadata associated with the compressed multimedia files. In this document, the term compression technique is used to denote the technique as well as parameters used by the compression technique, and hence when the same technique is used with different parameters, it is assumed to be a different compression technique. For e.g. while MPEG-4 is one compression technique, it could be used with different GOP (group of pictures) parameters of length and structure. In this disclosure, the term different compression technique is used even if only the parameters like GOP structure and length change. The compression technique used is stored as file-level data if the same technique is used for all sections, and as file-mark level data, if different compression technique is used for different sections based on some predefined metadata, for e.g. priority. Highlighted sections could use loss-less compression techniques whereas non-highlighted sections could use lossy compression that is size and bandwidth efficient, particularly in the case of CCTV-footages since reduced image quality for non-highlighted sections is better tolerated.

Encoder-Decoder (ED) 260, also referred to as ED 260 encodes a multimedia file for efficiency in transmission from one device to another via a network, and then decodes the encoded file on the receiving device. Encoder uses a chosen metadata-table associated with the multimedia file to encode it, such that it generates a 2-part file. The first part of the encoded file typically comprises the metadata-table and the highlighted sections as per the metadata-table that may or may not be compressed, combined so as to not repeat any multimedia sections in cases of overlapping or nested highlights. That is to say any overlapping highlights are encoded such that the encoded file contains the section of the multimedia file between earliest begin-file-mark and the latest end-file-mark of the overlapping highlights only once. The second part of the file comprises the non-highlighted sections of the multimedia files arranged in the chronological order. When using such a 2-part encoded file, the receiving device can decode the first part of the file and enable viewing of the highlights by the user, even before the second part is received. Also, the non-highlighted sections can be compressed using size and bandwidth efficient algorithms since latency is better tolerated. Using 2-part encoding helps the user to sample the media file and test for appeal using only first part. If the user doesn't like the highlights, the transmission of the second part of the file can be aborted, saving a lot of time for the user and also bandwidth. This is particularly relevant for mobile devices that typically work with limited and changing bandwidth availability. Further computation intensive decompressing of second-part can be done only for select media files. In some embodiments, encoding can be done on non-compressed files to generate 2-parts of the file, and each part can then be compressed independently using suitable techniques, with the techniques stored as file-level metadata.

Further, in one embodiment, the first part of the encoded file can be built using a subset of highlights, where the subset is identified by a predefined file-mark metadata. The second part of the encoded file in this case will comprise of the rest of the media file (i.e., parts not included in first part) where the compressed unselected highlights and un-highlighted sections are arranged in the right chronological order. In this case, it has to be ensured that overlapping and nested highlights are either selected to be in first part or second part of the file, and are not split between the two parts.

Alternatively, in another embodiment, the encoder could use two metadata tables, where in the first metadata table is used for encoding/decoding a media file for transmission and user sampling purpose and a second metadata table which is part of the second part of the encoded file and represented as a highlight in the first metadata-table, is used by the receiving device for navigating through the decoded media file.

FIG. 8 depicts the functionality of Encoder-Decoder by pictorially representing the input and output corresponding to a multimedia file that goes into the ED 260. In the metadata repository for the example multimedia file, as depicted by FIG. 8a, the file-marks are represented as an index-table, metadata associated as an information-table and finally a subset of metadata as metadata-table, FIG. 8b depicts a visual representation of a multimedia file and its highlights and metadata, while FIG. 8c and FIG. 8d, represent the output of the ED 260, which is a two-parts file.

Abridger module 270, which is also referred to as abridger 270 can be configured to abridge a multimedia file by eliminating unimportant sections. Abridger 270 uses metadata associated to a multimedia file and its file-marks particularly begin or end file-mark just succeeding or preceding a non-highlighted section that describes that particular non-highlighted section, and some preconfigured rules on the metadata to arrive at sections that can be dropped from the abridged file. These preconfigured rules on metadata can include rating data, censorship data, no. of likes, no. of views, etc., in combination with attributes of users who rated the file to drop highlighted and non-highlighted sections of multimedia file to create a shorter or abridged version of the file.

Exemplary Embodiments

FIG. 3 illustrates an exemplary system for automatic file-marking of media files by an external file-marking device 302 communicatively coupled with the electronic device 201 in accordance with an embodiment of the present disclosure.

In one embodiment, the system enables synchronization of the electronic device 201 with the external file-marking device 302 when a media recorder/player of the electronic device 201 is physically a different device from the one or more file-marking devices 302. The synchronization is achieved by synchronizing the clocks 303 and 307 of the electronic device 201 and the external file-marking device 302 respectively, using one system's clock as the master clock to reset the other clocks that act as the slave clocks. The process of clock synchronization at block 308, involves the slave device requesting the time from the master-device, and the master device sending the time to the slave device in response to the request. Further, the process involves the slave device using the time to reset its own time with the new time after adjusting the received time with pre-configured transmission delay. The file-marking devices can be in the form of external RFID/Barcode scanners, Sensors, etc., configured to include a time-stamp along with the scanned IDs or sensed data, so that linkages can be created between the CCTV-footage of the scanned object by a CCTV camera in the vicinity and the scanned object's data. File-marking devices can be connected to external RFID/Barcode scanners, readers, sensors, etc., using near zero latency connection for transferring scanned or sensed data, so that the CCTV-footage of the scanned object by a CCTV camera in the vicinity can be file-marked with scanned/sensed data.

In one embodiment, multiple media recorders, for example, CCTV cameras (to capture various views of a location) could have their clocks synchronized with one or more external systems in the vicinity programmed to perform certain transactions or sense an event, such as ATM-cash withdrawals, Self-checkout counters in a supermarket, Bar-code scanners, RFID-scanners, check-in or boarding counters in an airport that scan or type-in passports or passport details, magnetic swipe card readers, temperature sensors in a factory, etc. One of the external systems could be the designated master-clock, whose time is used to reset the clocks of the CCTVs and other external-systems in the vicinity. When a business or industrial process, at block 310, being executed on the external system encounters a pre-configured transaction or event, at block 312, for e.g. A cash withdrawal at an ATM, the external system can use the synchronized time of the clock in the external system (ATM) by requesting the current time, at block 314, that corresponds to the current file position of media recorder 202 to create a file-mark and attach it with metadata, at block 316, and store in the index table 304 and information table 306 of the storage unit 203. The metadata includes transaction data such as Card number, transaction ID, date-time, location coordinates (relevant especially if the external system is a mobile device, for e.g. a mobile ticketing m/c or a mobile checkout device in a supermarket), etc. Further, the external device 302, at block 318, initiates one or more predefined file-mark or tag-time actions if any.

The created file-mark can either be stored on the same device or transmitted to pre-configured network address in real-time. The decision to transmit the file-mark at block 320 either immediately as a result of tag-time trigger or at a later scheduled time can be based on metadata like the priority of the transaction/event or transaction data as per predefined configuration. For e.g. a repeated failed password entry at an ATM, could result in a file-mark with metadata and optionally media section of predefined length at the file-mark, to be transmitted in real-time to preconfigured network address as means to notify concerned personnel/systems for some action, for additional surveillance, for disaster recovery of the data, etc. In one embodiment, the action could be to trigger the CCTV camera to switch to higher resolution or take a still photo of the scene with higher resolution. Switching back to lower resolution on the CCTV can be manually triggered or time bound, and can be based on the priority of the event. This mechanism also optimizes on storage requirements for the CCTV footage files, since higher resolution can be used only when needed i.e., high priority events.

FIG. 4 illustrates an exemplary system for manual file-marking of media files in accordance with an embodiment of the present disclosure;

In another embodiment as depicted in the FIG. 4, external devices 302 (mobile or stationary) could be designed to capture file-marks manually for CCTV-footages being recorded by one or more media-recorders i.e., CCTV cameras 200, in the vicinity. The first step in such a process would be to synchronize the clocks of media-recorders and the file-marking devices. The synchronization is achieved by at block 402, by synchronizing the clocks 303 and 307 of the electronic devices 201 and the external file-marking devices 302 respectively, using one system's clock as the master clock to reset the other clocks that act as the slave clocks. Alternately all the devices could be configured to use their internal clocks that can be periodically reset with GPS-time. At block 404, a file-mark is created by the external device 302 when a request is made by the user on encountering an event, for which CCTV footage has to be referenced. Examples of such an event include a rules violation, suspicious behavior, misbehavior, etc. The user input is received through a user interface which triggers an interrupt handler within the file-marker. The external device 302 can use the synchronized time of the clock in the external system by requesting the current time, at block 406, that corresponds to the current file position of media recorder 202 to create a file-mark and attach it with metadata, at block 408, and store in the index table 304 and information table 306 of the storage unit 203. The created file-mark can either be stored on the same device and uploaded to a pre-configured network address periodically or transmitted to the pre-configured network address in real-time. The user may optionally create an end file-mark to denote the end of an event. Alternately, the system may infer an end of an event based on a pre-configured time duration for the event. The decision about when to transmit the file-mark, at block 410, to a remote network address can be based on metadata like the priority of the event or other data as per predefined configuration. Since there are multiple CCTV-footages being recorded simultaneously, each file-mark generated by the external device 302 is mapped to one or more CCTV-footages based on predefined criteria on file-mark metadata (e.g. location of external device 302) and metadata on CCTV-footage (e.g. location of CCTV camera 202) by a component called File-mark-consolidator-FMC (not shown in the figure). Also, the FMC adjusts the generated file-marks to be relative to the begin of mapped CCTV-footage using start-time of recording the CCTV-footage and any pause times of CCTV-camera using a predefined algorithm.

FIG. 5 illustrates an exemplary system for manual file-marking of media files (CCTV-footages in this case) on observed events by mobile devices in accordance with an embodiment of the present disclosure;

The system 500 as depicted in FIG. 5, enables manual file-marking of CCTV-footages when a event is noticed by the users of mobile devices. The system 500 comprises one or more CCTVs 502-1, 502-N (hereinafter collectively referred to as CCTVs 502) and one or more users using mobile devices 504-1, 504-2, 504-N (hereinafter collectively referred to as user or alternatively mobile device 504). The user 504 may be a police man, traffic police or a security guard who could use a mobile device to manually create file-marks on CCTVs 502 in the vicinity on events like crime, rules-violation, misbehavior, suspicious behavior, etc. The metadata for the created file-mark could include data automatically inserted by the device and data manually entered by the user. Automatically inserted data includes location coordinates (picked by location-sensitive mobile devices), user-ID, device-ID, and date-time (synchronized time if available and device date-time). Manually entered metadata include event type from predefined list, event severity from predefined list, vehicle number if relevant and any other relevant details including files (e.g. photos, videos, audio, etc.).

In one embodiment, vehicle number could also be suggested or detected automatically by the mobile device 504, if the vehicles are embedded with RFIDs and the mobile device 504 is equipped with an RFID-scanner or communicatively couple with an RFID-scanner nearby. On start of an event, the mobile device 504 can initiate RFID scan requesting the passing vehicle-RFIDs to respond with their vehicle number (and vehicle type, if available). The scanner scans the responses and then displays all the scanned vehicle numbers (with vehicle types, for faster identification) as a list on the mobile device 504, from which one or more vehicle numbers of erring vehicles can be quickly selected by the monitoring traffic police officer to be tagged to the file-mark being recorded for the event. Alternately, the mobile device 504, if predominantly used for vehicle management, for e.g. by traffic police, could always have the scanned vehicle numbers available as a scrolling list on the device, so that a file-mark for an event can be quickly recorded on an erring vehicle. For roads with high traffic, FIG. 6 depicts an arrangement of FRID scanners that could be used to increase the percentage identification of vehicles moving through a stretch of road.

In addition to creating a file-mark, the mobile device 504 could be equipped to take a still photo or video-shoot of the scene. The still photo or video-file could be used as additional metadata for the file-mark on the CCTV footage. This metadata along with file-marked CCTV-footage would give significant evidence and details to prosecute offenders. The location-coordinates for each file-mark can be used to determine as to which CCTVs footage would be most relevant for the specific file-mark, especially when there are multiple CCTVs in the vicinity and the users using the mobile devices are mobile. Here again, individual file-marks could be transmitted to a remote network-address in real-time or stored on the device locally till end-of-day in the form of Metadata tables. Physical format of the metadata-table or individual entries in it could be customized to be a more efficient device-specific format. The real-time transmission of file-marks could be restricted to high priority events as determined by the metadata entered e.g. event priority or severity. For certain events such as an accident, serious crime, etc., additional notifications and actions (e.g. turning on video recorder, initiating a call, etc.) can be triggered by the mobile device too. At the receiving network address, the File-Mark-Consolidator-FMC (not shown in the picture) processes the various file-marks with metadata from multiple users and devices and file-marks are additionally tagged with one or more CCTV-ID(s) 502 based on preconfigured threshold proximity between the captured location coordinates and the location of the CCTV(s) 502. Then FMC maps all the file-marks tagged with the same CCTV-ID to one specific CCTV-footage if multiple footages were created by the same CCTV camera, adjusts file-marks to be relative to the begin of mapped CCTV-footage and then consolidates file-marks on one CCTV-footage into a single Metadata table. Thus, there could be cases where the same file-mark and metadata generated by one mobile device is present in multiple Metadata tables corresponding to multiple multimedia files.

FIG. 6 illustrates an exemplary embodiment showing arrangement of RFID scanners for file-marking CCTV-footage in accordance with an embodiment of the present disclosure.

The system 600, as depicted in FIG. 6, comprises a RFID scanner 602 communicatively coupled with one or more CCTV cameras 604-1, 604-2, 604-N (hereinafter collectively referred to as CCTVs 604) and a file-marking device such as mobile device 606.

When a CCTV-camera is used along with a co-located RFID scanner, RFID scanners can be used to effectively create file-marks in CCTV-footages so that there is a linkage established between the scanned object and the CCTV-footage. For e.g. RFID scanners could be used to file-mark CCTV-footages in airports with scanned RFIDs on passports, at secure entry/exit when user access is through RFID-tagged access cards, on road entry/exit when vehicles are RFID-tagged, etc. The file-marks can be automatically created with the all the scanned RFIDs or there can be a filter mechanism to selectively file-mark CCTV-footage with only specific scanned RFIDs, like important, black-listed or stolen items' RFID-tags as defined by configured data. Filtering can also be manual based on other observed factors. RFID scanner should be configured to generate data in the format <Time-stamp>:<RFID-Tag>:<Location-Data>. Time-stamp denotes the time of scan, RFID-Tag identifies the scanned object and Location-data identifies the location of the scan. Location-data may not be required if the RFID-Scanner is stationary and closely co-located with the CCTV camera(s).

The system 600 illustrates an arrangement that enables scanning of vehicle RFIDs by the RFID scanners working in conjunction with the CCTV cameras in the vicinity to automatically file-mark CCTV-footages with all scanned vehicle numbers passing by. The same arrangement can also be used to assist in file-marking CCTV-footages manually by mobile devices only on traffic violations as described above. Vehicle RFID data could include the vehicle registration number and optionally a code to denote the vehicle type like 2 wheeler, 4 wheeler, HMV, etc. The RFID scanner could be positioned along with CCTV cameras on a pole of a suitable height.

In one embodiment, RFID scanners can operate in a set of 2 or more, located on opposite sides of a road to maximize scan percentage of vehicles moving through a stretch of road. The maximization is achieved because any scans missed by the first scanner can be caught by the subsequent one. Scan misses are more likely to happen when there are too many vehicles and/or the speed of the vehicles is too high. The scanned vehicles RFIDs are muted for a preconfigured time interval to reduce tag-initiated collisions and maximize scan percentage at the current scanner and also subsequent scanners in the set. The time interval chosen is such that the muted RFIDs stay muted until they cross all the scanners in the set. Though the scanner sends out a mute signal to the scanned vehicle RFIDs, due to high speeds of the moving vehicles, the mute signal may not reach the scanned vehicle RFID in time. To ensure that the mute signal was effective, the scanned RFID list is also relayed to the adjacent scanners (either directly or through a computer), to re-initiate a mute signal on the scanned vehicle RFIDs. The adjacent scanners can be decided based on the direction of the traffic (unidirectional, bi-directional), scan range and the width of the road. If the scan range is smaller than the width of the road in one direction, the relay of scanned RFIDs can be limited to only scanners ahead on the road.

Alternately, the mute signal could use a higher strength signal as compared to read/scan signal to be able to reach vehicles moving away at high speed. The read/scan signal could be weaker to produce a smaller scan range that ensures fewer tag responses reducing tag-collisions, while a bigger range for mute signal will ensure that the scanned tags do not introduce collisions in subsequent scanners. A computer can consolidate scanned vehicle RFIDs and transmit the list to File-markers working on CCTV-cameras in the vicinity, connected either wirelessly or using a wired connection.

FIG. 7 illustrates a flowchart of a method for crowd-sourcing file-marks for media files in accordance with an embodiment of the present disclosure.

In one embodiment, the features of file-marking CCTV footage in the vicinity could be captured in a mobile application, using mobile phones as FTMs. Such a mobile application could be freely downloadable by civilians for use in the event of them witnessing or encountering any crime, rules violation, suspicious behavior or emergency. The method 700 enables file-marking of media files by multiple users using the mobile application on their mobile phones or devices.

At block 702, the clocks of user mobile devices are synchronized with the clocks of CCTV cameras in the vicinity. In one embodiment, synchronization could just be periodic resetting of device clocks with GPS-time, if available, or simply using internal device time. At block 704, on witnessing an event, user clicks 'Begin event' on the mobile application and the begin-file-mark is generated. At block 706, upon creating a begin-file-mark, the metadata associated with the file-marks is captured. In one embodiment, the mobile application automatically captures data known to the device including location coordinates (picked by location-sensitive devices), user-ID, device-ID, and date-time (synchronized time if available and device date-time). User can then enter additional data manually. Manually entered metadata can include event type from predefined list, event severity from predefined list, vehicle number if applicable, manually taken photo or video-shoot and any other details.

At block 708, the end-file-mark is created at the end of the event. In one embodiment, the mobile application is configured to create an end-file-mark after a predetermined time interval, if not received by the user. At block 710, upon creating the end-file-mark, the created file-marks are stored in the storage unit along with the metadata on the mobile device. At block 712, the file-marks and the associated metadata is then uploaded to a preconfigured network address. The file-marks and the associated metadata are uploaded a) immediately, especially for high priority events if connection exists, b) when connection exists or c) at a scheduled time.

In another exemplary embodiment, medical recordings like ECG, EEG generated by some medical equipments can be automatically file-marked for exceptions in real-time. Typically the medical recordings are generated by an equipment with data collected by a measuring device attached to a patient. If the measuring device uses a synchronized clock with respect to the recording equipment, it can create file-marks in the medical recording when the measured data is beyond the defined normal range. In another embodiment, the file-marks can be created on a multimedia recording like ECG, by a synchronized measuring device that is periodically measuring some other parameter like body temperature, electrical activity in the brain, etc., on the event of the measured parameter being outside predefined normal range. In an embodiment, multiple multimedia files being are being created using recordings from one or more instruments like ECG, EEG, temperature, etc., one or more multimedia files can be file-marked when any of the measurements are abnormal as per preconfigured rules. For the file-marks generated in the above examples, the measurements from the synchronized measuring devices could be the metadata. In these examples, the event of file-marking itself can trigger an action to draw attention, for e.g. a hardware interrupt to sound alarm or software interrupt to send an SMS to a preconfigured address. The action can also be configured to be a function of metadata generated.

In another embodiment, external file-marking devices can be used to file-mark one or more multimedia files playing simultaneously as explained below. For e.g., in a multi-room conference at trade-shows or multi-room lecture halls in a university, multiple multimedia files could be played simultaneously by one or more time synchronized multimedia-players in different rooms, where participants or students are moving from one room to another as per interest or as per a time-table. The multimedia players are configured to record location, start and end time of playing each multimedia file, either as part of file-level metadata or in a predefined storage location. Here again, each participant/student can use a time synchronized mobile phone to generate file-marks and metadata on any of the currently playing multimedia files while in any of the rooms. The generated file-marks and metadata can be uploaded to a central server either at the end of the day or periodically during the day for automatic mapping by File-Mark-Consolidator.FMC maps a file-mark to the right media file based on (i) a threshold location-proximity of file-mark's location with respect to the played-location of the multimedia files, and (ii) time of the file-marks with respect to begin-play and end-playtimes of multimedia-files played on that day. Alternately, the user could scan a bar-code denoting the URI of the currently playing multimedia file in any room to map all subsequent file-marks to that media file and then upload all the file-marks to the central server for adjustment. Once the file-marks are mapped to the right media files, the FMC will adjust the mapped file-marks to be relative to the beginning of the mapped multimedia file using play-start-time and pause-times of the mapped multimedia file. Thus even if the participants/students are randomly moving from one room to the other, the file-marks and metadata generated by them can be mapped to the right media files and adjusted, by uploading them to central server at the end of the day, or periodically during the day. Further, the mapped and adjusted file-marks and metadata can be consolidated by the FMC into one or more metadata-tables or a single play-list which can be used on the server or downloaded to the user device. Such an arrangement will tremendously help the users or students to review the day's screenings and presentations quickly.

In another embodiment at a factory, one or more mobile file-markers operated manually or connected to various kinds of sensors can be used to file-mark abnormal or incorrect readings of various factors like temperature, humidity, radiation levels, etc., that can be used to file-mark graphs of such data created by full-time sensors installed at strategic locations such a near a boiler, store-room, reactor, etc. The file-marks created can be qualified by metadata that will be used by the file-mark consolidator (FMC) to map it to appropriate multimedia file in the form of a graph generated by a sensor/recorder.

In yet another embodiment, file-markers can be used to create file-marks or highlights of various events in a complex real-time system like air traffic management, where the multimedia manipulators are geographically distributed with some being on the ground in a control room, while others being on board one or more flights. Typically in such a real-time system, the multimedia manipulators include graphical recordings of various instruments measuring altitude, atmospheric pressure, temperature, etc., along with audio/video recordings of the discussions between ground staff and on-board crew. Any file-mark, say due to abnormal altitude, can be used to file-mark all the other multimedia files being recorded/manipulated in the real-time system. Alternately, in such embodiments, file-markers could be paired with specific multimedia manipulators for e.g. one or more file-markers on the ground can be paired with one or more multimedia recorders/manipulators on board a particular flight as part of pre-configuration, such that any file-marks from the paired file-markers are mapped only to the multimedia files from that flight. Thus in this embodiment, location-proximity is over-ruled by preconfigured pairing data to map file-marks to one or more multimedia files.

In an exemplary embodiment, the multimedia manipulation platform 102 could be a search engine that facilitates users to search for multimedia files on the web. A multimedia file on a web page can be qualified by special tags that contain the file-marks, highlights and metadata associated to the file as xml data or text data in predefined formats. In an embodiment, the multimedia file on a web page can be qualified by a special tag that stores a pointer, URI or URL to at least one of a file or a web-service; wherein the file contains the file-marks, highlights and metadata, and web-service returns the file-marks, highlights and metadata associated to the multimedia file.

The search engine can then index the metadata associated to a multimedia file by retrieving it appropriately, when it encounters a multimedia file on a web page. The user entered search input is then used to match the metadata at both file-level and file-mark-level to result in one or more multimedia files and its respective file-marks and highlights that had matching metadata. The result set is hierarchical list, similar to a play-list discussed in the preceding sections, wherein the user can access either the multimedia file or directly access the file-marks or highlights in the result set. Further user can play all highlights in the result set uninterruptedly using a single operation.

In an embodiment, uninterrupted playing of highlights can be restricted to result set of one file at a time. In an embodiment, the search results, namely the multimedia files and its respective file-marks and highlights if present are ranked based on the extent of metadata match. The ranking uses predefined algorithms/techniques based on at least one of (i) no. of times of occurrence of the searched data in the metadata, (ii) kind of metadata match, kinds being file-level or file-mark-level match that includes keyword-name and keyword-value match, keyword-value match, keyword-name match, predefined tag match and custom tag match; wherein each kind of match is associated to a predefined weight and (iii) preconfigured set of dynamic metadata (such as rating, no. of shares, no. of votes, etc.), associated to the multimedia files and file-marks/highlights.

Further, the rank of the multimedia file will include two components, the first being the rank due to file-level metadata and second component being the sum total of all the ranks of its file-marks and highlights in the result set. The two can be combined to derive a single rank for the multimedia file as per predefined weights. The rank of a multimedia file is used to sort the search results, whereas the file-marks and highlights of the multimedia file in the result set can either be sorted by rank or sorted by their sequence within the multimedia file with rank as qualifying data. In an embodiment, the search results display can include representative-frames of the multimedia file(s), file-mark(s) and highlight(s).

In an exemplary embodiment, the ranking algorithm could look like this. For every word in the search string, a weightage factor based on kind of metadata match is computed along with frequencies if occurrence of each word. Then a sum of weighted frequencies is computed. In an embodiment, the weighted frequencies can be further multiplied by file-mark rank of the matched file-mark, wherein file-mark rank is a sum of any of weighted rating, number of votes and no. of shares. This value is then further multiplied by a file rank value which is computed by weighted product of any of number of votes, rating and shares received.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Many variations of the invention and embodiments herein described will be apparent to people skilled in the art. For example, features of the different embodiments disclosed herein may be omitted, selected, combined or exchanged in order to form further embodiments. Again, where a preference or particularization is stated, there is implicit the possibility of its negative, i.e. a case in which that preference or particularization is absent. The invention is considered to extend to any new and inventive embodiments formed by said variations, further embodiments and cases, without deviation from scope of the invention.

The various aspects and embodiments disclosed herein are for purposes of illustration and are not intended to be limiting, with the true scope and spirit being indicated.

We claim:

1. A computer-implemented method for marking highlights in a multimedia file, the multimedia file being manipulated on a multimedia manipulation platform, the method comprising:
    receiving one or more file-marks from one or more file-markers, wherein each of the one or more file-mark corresponds to a particular locations in the multimedia file and storing the received file-marks in a metadata repository corresponding to the multimedia file, and
    triggering one or more pre-configured actions on the multimedia manipulation platform at the instance of one of: receiving the file-mark, manipulating the multimedia file at the file-mark and receiving a request to access the file-mark, the pre-configured actions being a function of at least one of contextual environmental data, user input and profile attributes of one or more devices and one or more users;
    wherein, the file-mark is defined by at least one of:
        i. a time offset from the beginning of the multimedia file or a previous file-mark;
        ii. a frame offset from the beginning of the multimedia file or a previous file-mark; or
        iii. a byte offset from the beginning of the multimedia file, a previous file-mark or begin of frame defined by at least one of time offset or a frame offset;
    the method further comprising at least one of:
        querying and receiving metadata from one or more parts of the multimedia manipulation platform to be associated with a received file-mark, wherein the received metadata can either be static, or dynamic, and storing the metadata in a metadata repository corresponding to the multimedia file and the received file-mark; the metadata comprising one or more data elements that are at least one of pre-defined keywords with associated values, predefined tags and custom tags,
        wherein the metadata for a multimedia file can be shared by many variant formats of the multimedia file by having each metadata set at a file-mark uniquely identified, where the unique identifier representing the file-mark is associated with one or more format types and particular location data specific to that format type.

2. The method as in claim 1, wherein a received file-mark is a begin file-mark or an end file-mark and the method further comprises the steps of pairing the begin file-mark and the end file-mark as per preconfigured rules to denote a highlight section.

3. The method as in claim 2, further comprising triggering at least one preconfigured action on the instance of at least one of pairing two file-marks to create a highlight section and manipulating the multimedia file corresponding to the highlight section; wherein the preconfigured actions triggered are a function of at least one of contextual environmental data, user input and profile attributes of one or more devices and one or more users.

4. The method as claimed in claim 2, wherein the file-marker is configured to handle an unpaired file-mark by at least one of
    i. defining the missing file-mark of the pair to be at a preconfigured distance from received end file-mark or begin file-mark respectively, where the distance can be defined in terms of number of frames, time-offset or byte-offset from the given file-mark of the incomplete pair,
    ii. defining the missing begin or end file-mark of the incomplete pair to be at the end of the previous highlight section or begin of the succeeding highlight section respectively
    iii. defining the missing begin or end file-mark to be the same as the begin or end of multimedia file respectively and
    iv. replacing the unpaired file-mark with a new pair of begin file-mark and end file-mark such that the new file-marks are at preconfigured distances from the unpaired file-mark on either side of it.

5. The method as in claim 2, wherein a multimedia manipulator is a search engine that indexes and searches web pages containing one or more multimedia files with associated file-marks and metadata represented as at least one of values for qualifying html-tags and contained in a file, a pointer to which is stored in a qualifying html-tag, such that any search using the search engine will result in at least a search-list with one or more multimedia files and also specific highlights and file-marks within the multimedia files that are associated with the data that was searched for.

6. The method as in claim 5, wherein the search engine further assigns one or more types of ranks to the search results comprising of multimedia files, highlights and file-marks using predefined techniques based on at least one of (i) number of times of occurrence of the searched string in the metadata, (ii) kind of metadata match, kinds being file-level or file-mark-level match, wherein each of file-level and file-mark level match includes keyword-name and keyword-value match, keyword-value match, keyword-name match, predefined tag match and custom tag match; where in each kind of match is associated to a predefined weight and (iii) preconfigured set of dynamic metadata associated to the multimedia files and file-marks.

7. The method as in claim 2, wherein file-marks and metadata generated using an external file-marking device i) is one of transmitted, mapped, adjusted and stored into the metadata-repository immediately or ii) consolidated into one metadata-table at the end of session in the device, in order to be transmitted, mapped, adjusted and stored into the metadata-repository based on preconfigured rules that include metadata values of the file-mark.

8. The method as claimed in claim 2, further comprising abridging the multimedia file by removing one or more non-highlighted and highlighted sections from the multimedia file based on predefined file-level metadata and predefined file-mark-level metadata associated with the non-highlighted and highlighted sections.

9. The method as in claim 1, further comprising triggering one or more preconfigured actions on instance of at least one of receiving metadata, manipulating the multimedia file at file-marks associated with metadata and on receiving a request to access associated metadata, wherein the preconfigured actions triggered are a function of at least one of contextual environmental, user input, associated metadata and profile attributes of one or more devices and one or more users.

10. The method as in claim 1, wherein the file-marker is at least one of a) software module of the multimedia manipulation platform that provides the current position of the multimedia file being manipulated as a file-mark on at least one of detecting that a preconfigured condition is being met in the content of the multimedia file being manipulated and receiving an interrupt, b) a hardware module including an user interface module, communicatively coupled with the multimedia manipulation platform that generates a file-mark on preconfigured user-input, wherein at least one of time of user-input, input screen coordinates and input data are used to compute file-marks and c) an external device communicatively coupled to the multimedia manipulation platform equipped with at least one of an user interface, event listener and a sensing mechanism and including a clock that is synchronised with that of the multimedia manipulation platform, wherein time on the synchronised clock is used for computing a file-mark on preconfigured events.

11. The method as in claim 1, wherein at least a subset of the file-marks, highlighted sections and associated metadata of the multimedia file is rendered using preconfigured user interface components on at least one device of the multimedia manipulation platform to enable direct access for manipulation by the multimedia manipulator without having to sequentially traverse the section of multimedia file between the current position and a selected file-mark, highlight section or metadata, wherein the constituents of subset of file-marks and metadata rendered and the user interface components used are functions of at least one of prior configuration, associated metadata, user input, contextual environmental data, profile attributes of one or more devices or one or more users.

12. The method as claimed in claim 1, wherein user controls are made available to navigate the multimedia file through an user interface on at least one of the devices on the multimedia manipulation platform, wherein the user controls facilitate at least one of jumping to next file-mark, jumping to previous file-mark, change default behaviour of multimedia player like play sequence & play speed, accept user-input, play a summary of media by playing selected highlights as per pre-configured metadata or by playing a preconfigured duration of the file around file-marks and search multimedia file for user provided data in at least one of the tracks of the multimedia file.

13. The method as claimed in claim 1, further comprising storing file level metadata for a multimedia file by associating it with at least one of the file-mark denoting begin-position of the multimedia file and the file-mark identified by a predefined metadata; wherein the file level metadata comprises metadata that is at least one of received, computed and read from at least one of the native format of the multimedia file and operating system of the multimedia manipulation platform, and includes at least one of device profile attributes, user profile attributes, location coordinates, various timestamps such as creation time, last accessed time, manipulation start time, manipulation end time, manipulation pause start and end times.

14. The method as claimed in claim 1, wherein one or more users having access to a multimedia file can generate file-marks and metadata for the multimedia file and then grant access rights to the generated file-marks and metadata to one or more other users and user-groups in a multi-user environment.

15. The method as claimed in claim 1, wherein keyword values can be of predefined data-types including text, date, numbers, files (containing picture, audio, flash, video, etc.), pointers to external files, URL, URN, URI, pointers to trigger functions, pointers to other file-marks within the same multimedia file, pointers to file-marks in external files and arrays of the above data-types.

16. The method as in claim 1, wherein a sub-set of one or more file-marks and associated metadata from the metadata repository for a multimedia file is consolidated into one or more metadata-tables, using at least one of automatic and manual consolidation process.

17. The method as in claim 1, wherein highlights in a metadata-table are used to automatically build a hierarchical list for a multimedia file to be used in user-interface of a multimedia manipulator to facilitate navigation and summarization of the multimedia file, where a predefined file-mark-level metadata is used as the name of the entry for that highlight, the sequence of a highlight is decided by at least one of the start position of the begin-file-mark of the highlight in relation to other highlights and a predefined metadata at file-marks and the level of the entry is assigned such that (a) highlights that are nested within other highlights as defined by their start and end positions are considered to be one level lower with respect to the immediate containing highlight and (b) overlapping highlights are considered to be at the same level.

18. The method as in claim 1, wherein a search on metadata in metadata repository can result in one or more multimedia files and their associated one or more highlights and file-marks as per user's access rights which can be further short-listed, sequenced using file-mark-level metadata and saved as a search-list for at least one of playing the entries uninterruptedly using a single click, directly accessing play-list entries and sharing with other users.

19. The method as in claim 1, wherein one or more file-marks generated in real-time by one or more synchronised file-marking device can be used to file-mark one or more multimedia files of one or more types being manipulated simultaneously by one-or-more multimedia manipulators with synchronised clocks, by mapping generated file-marks to one or more multimedia files based on predefined criteria in addition to the following:
 a. a creation time of file-mark being greater than a start-time of manipulating a multimedia file and
 b. a creation time of file-mark being less than an end-time of manipulating a multimedia file.

20. The method as in claim 19, wherein the predefined criteria to map a generated file-mark to one or more multimedia-manipulators includes at least one of a) predefined rules on mapping at least one of metadata associated to file-marks, attributes of users and file-markers to one or more attributes of at least one of multimedia manipulators and multimedia files b) location proximity based on location data of multimedia manipulators and file-marks, c) predefined configuration data pairing one or more sets of one or more file-markers to one or more sets of one of more multimedia manipulators, and d) directional orientation of the multimedia manipulators and file-markers.

21. The method as in claim 19, wherein mapped file-marks generated by the synchronised file-marking devices are adjusted to compute file-marks relative to a begin of a multimedia file, by subtracting the noted begin time of manipulating of the multimedia file from each mapped file-mark time created by a synchronised file-marker, so that adjusted file-marks denote time-offset relative to begin of file.

22. The method as in claim 21, wherein an adjustment of the mapped file-marks, when multimedia manipulator can have one or more pauses during manipulation, further comprises:
 a. subtracting a start time of multimedia manipulation from absolute pause start and end times recorded by multimedia manipulator using synchronised clock, if pause times are not relative to begin of media file,
 b. Changing a file-mark time to a begin of pause-duration if it corresponds to a pause duration,
 c. Subtracting all the pause-durations from the file-mark time, where the pause-end-time is lesser than the file-mark time.

23. The method as in claim 21, wherein a process of adjustment further includes converting resulting file-marks with time-offset from begin of file into at least one of number of frames offset and byte-offset from begin of file, if two are related, using preconfigured conversion formulae.

24. The method as claimed in claim 1 further comprising, compressing independently sets of a) one or more highlight sections and b) one or more non-highlight sections of a multimedia file as defined by a selected metadata-table.

25. The method as claimed in claim 1, further comprising encoding the multimedia file, wherein a process of encoding comprises generation of at least 2-parts of the multimedia file using a chosen metadata-table, such that a first part of encoded file comprises a subset of highlighted sections of multimedia file as per the chosen metadata-table, where the subset of highlighted sections is defined by predefined metadata at file-marks and a second part of the encoded file comprises rest of the multimedia file including highlighted sections not in the first part of encoded file and the non-highlighted sections combined together in a right chronological sequence and where the chosen metadata-table is included in at least one of the first and second part of encoded file as per configuration.

26. The method as claimed in claim 25, wherein the process of encoding further comprises including a second metadata-table in the second part of the encoded file and represented in the first metadata-table as if it were a highlight, so that the decoded file can be navigated and manipulated using the second metadata-table instead of the first metadata-table and the first metadata-table is used only for encoding, decoding and user sampling.

\* \* \* \* \*